United States Patent
Roever et al.

(10) Patent No.: US 12,465,171 B2
(45) Date of Patent: Nov. 11, 2025

(54) THREE DIMENSIONAL INDUCTION RETHERMALIZING STATIONS AND CONTROL SYSTEMS

(71) Applicant: The Vollrath Company, L.L.C., Sheboygan, WI (US)

(72) Inventors: Peter Roever, West Bend, WI (US); Yang Wang, Grafton, WI (US); John Wojcik, Sheboygan, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 1059 days.

(21) Appl. No.: 17/139,634

(22) Filed: Dec. 31, 2020

(65) Prior Publication Data
US 2021/0121003 A1    Apr. 29, 2021

Related U.S. Application Data

(63) Continuation of application No. 14/737,190, filed on Jun. 11, 2015, now Pat. No. 10,973,368, which is a
(Continued)

(51) Int. Cl.
*A47J 36/24* (2006.01)
*A47J 39/02* (2006.01)
(Continued)

(52) U.S. Cl.
CPC .......... *A47J 36/2483* (2013.01); *A47J 39/02* (2013.01); *H05B 6/06* (2013.01); *H05B 6/12* (2013.01)

(58) Field of Classification Search
CPC .......... A47J 36/2483; A47J 9/02; A47J 39/02; H05B 6/06; H05B 6/12
See application file for complete search history.

(56) References Cited

U.S. PATENT DOCUMENTS 2,257,580 A * 9/1941 Trompeter .............. F24C 15/02
219/418
3,761,667 A    9/1973 Walden
(Continued)

FOREIGN PATENT DOCUMENTS

EP    0 458 977    12/1991
JP    04-267092    9/1992
(Continued)

OTHER PUBLICATIONS

KR 101335728 B1 (Yang, Jae-Bok) Dec. 2, 2013 [retrieved on Dec. 28, 2024]. Retrieved from Foreign Image and Text Database, translation by Clarivate Analytics. (Year: 2013).*
(Continued)

*Primary Examiner* — John J Norton
(74) *Attorney, Agent, or Firm* — Foley & Lardner LLP

(57) ABSTRACT

A rethermalizing station includes a well defined by a side wall, a food pan configured to be inserted into the well and to hold a food item, a first induction coil surrounding the side wall of the well, the first induction coil configured to warm the food item via inductive heating of the food pan, a first temperature sensor configured to detect a temperature of the food pan, and a control unit coupled to the first induction coil and the first temperature sensor, the control unit configured to control the first induction coil in response to the temperature of the food pan detected by the first temperature sensor such that temperature of the food pan is maintained at a targeted temperature.

19 Claims, 27 Drawing Sheets

Related U.S. Application Data continuation of application No. PCT/US2013/074368, filed on Dec. 11, 2013, which is a continuation-in-part of application No. 13/712,792, filed on Dec. 12, 2012, now Pat. No. 9,307,862.

(60) Provisional application No. 61/818,711, filed on May 2, 2013.

(51) Int. Cl.
*H05B 6/06* (2006.01)
*H05B 6/12* (2006.01)

(56) References Cited

U.S. PATENT DOCUMENTS

| | | | |
|---|---|---|---|
| 3,775,577 A | 11/1973 | Peters, Jr. | |
| 3,979,572 A | 9/1976 | Ito et al. | |
| 4,085,300 A | 4/1978 | Mackenzie et al. | |
| 4,114,010 A * | 9/1978 | Lewis | H05B 6/06 |
| | | | 219/666 |
| 4,356,371 A | 10/1982 | Kiuchi et al. | |
| 4,686,340 A | 8/1987 | Fukasawa | |
| 4,856,579 A | 8/1989 | Wolfe | |
| 4,990,749 A | 2/1991 | Devine et al. | |
| 5,070,222 A | 12/1991 | Yahav et al. | |
| 5,201,797 A | 4/1993 | Weng | |
| 5,386,102 A | 1/1995 | Takikawa et al. | |
| 5,512,733 A | 4/1996 | Takikawa et al. | |
| 5,746,119 A | 5/1998 | Matsumoto | |
| 6,058,245 A * | 5/2000 | McNamara, Jr. | A47J 37/1266 |
| | | | 126/374.1 |
| 6,145,333 A | 11/2000 | Richmond et al. | |
| 6,434,961 B2 | 8/2002 | Richmond et al. | |
| 6,774,346 B2 | 8/2004 | Clothier | |
| 6,774,356 B2 | 8/2004 | Heslin et al. | |
| 7,009,159 B2 | 3/2006 | Kataoka et al. | |
| 8,212,192 B2 | 7/2012 | Tominaga et al. | |
| 8,481,893 B2 | 7/2013 | Rosenbloom et al. | |
| 8,796,599 B2 | 8/2014 | Sakakibara et al. | |
| 9,307,862 B2 | 4/2016 | Roever et al. | |
| 2002/0008102 A1* | 1/2002 | Boyd | H05B 6/062 |
| | | | 219/627 |
| 2002/0117497 A1 | 8/2002 | Bassill et al. | |
| 2002/0125245 A1 | 9/2002 | Fuchs | |
| 2002/0162829 A1* | 11/2002 | Weber | H05B 3/26 |
| | | | 219/209 |
| 2003/0019868 A1* | 1/2003 | Beer | H05B 6/101 |
| | | | 219/646 |
| 2004/0065658 A1 | 4/2004 | Damiano et al. | |
| 2005/0121438 A1 | 6/2005 | Hirota et al. | |
| 2008/0047948 A1 | 2/2008 | Rosenbloom et al. | |
| 2008/0257166 A1 | 10/2008 | Peng | |
| 2010/0258556 A1 | 10/2010 | Hayashi et al. | |
| 2010/0293979 A1 | 11/2010 | Shei et al. | |
| 2011/0000904 A1 | 1/2011 | Sakakibara et al. | |
| 2011/0011850 A1 | 1/2011 | Rosenbloom et al. | |
| 2011/0114618 A1 | 5/2011 | Chung et al. | |
| 2011/0175737 A1 | 7/2011 | Pforte et al. | |
| 2011/0180530 A1* | 7/2011 | Jeanneteau | H05B 6/062 |
| | | | 219/621 |
| 2012/0061381 A1 | 3/2012 | Hashimoto et al. | |
| 2012/0152932 A1 | 6/2012 | Moon et al. | |
| 2012/0285946 A1 | 11/2012 | Brosnan | |
| 2012/0305546 A1 | 12/2012 | Filippa et al. | |
| 2013/0008889 A1* | 1/2013 | Ogasawara | H05B 6/062 |
| | | | 219/622 |
| 2013/0037237 A1* | 2/2013 | Shackelford | A47F 3/0486 |
| | | | 165/47 |
| 2013/0082046 A1 | 4/2013 | Ogasawara et al. | |
| 2014/0234497 A1* | 8/2014 | Sladecek | A47J 36/16 |
| | | | 99/331 |

FOREIGN PATENT DOCUMENTS

| | | | | |
|---|---|---|---|---|
| KR | 101335728 B1 * | 12/2013 | | A47J 27/082 |
| WO | WO-2014/093476 A1 | 6/2014 | | |

OTHER PUBLICATIONS

Installation and Operation Manual for Garland induction Temperature Controlled Tabletop Hold-Line with RTCSmp Technology, 2013, Garland Commercial Ranged Limited, revised Jan. 17, 2014, 24 pages.

International Search Report and Written Opinion for Application No. PCT/US2013/074368, mail date Mar. 27, 2014, 19 pages.

Extended European Search Report for EP Application No. 13863536, dated Jan. 15, 2016, 2 pages.

Extended Search Report for European Application No. 17166801.5, mail date Jul. 14, 2017, 5 pages.

International Preliminary Report on Patentability for International Application No. PCT/US2013/074368, dated Jun. 16, 2015, 16 pages.

* cited by examiner

THREE DIMENSIONAL INDUCTION RETHERMALIZING STATIONS AND CONTROL SYSTEMS

CROSS-REFERENCE TO RELATED PATENT APPLICATIONS

This application is a continuation of U.S. application Ser. No. 14/737,190, filed Jun. 11, 2015, which is a continuation of International Application No. PCT/US2013/074368, filed Dec. 11, 2013, which is a continuation-in-part of U.S. application Ser. No. 13/712,792, filed Dec. 12, 2012. International Application No. PCT/US2013/074368 also claims the benefit of priority to U.S. Application No. 61/818,711, filed May 2, 2013. International Application No. PCT/US2013/074368 and U.S. application Ser. Nos. 14/737,190, 13/712,792, and 61/818,711 are hereby incorporated herein by reference in their entireties.

BACKGROUND

The present invention relates generally to the field of food service equipment. More specifically the present disclosure relates to serving stations having heated wells for warming, rethermalizing, or cooking food items stored in food pans resting in the wells.

SUMMARY

One embodiment of the invention relates to a rethermalizing station for rethermalizing or warming food items. The rethermalizing station includes a well defined by a side wall, a food pan configured to be inserted into the well and to hold a food item, a first induction coil surrounding the side wall of the well, the first induction coil configured to warm the food item via inductive heating of the food pan, a first temperature sensor configured to detect a temperature of the food pan, and a control unit coupled to the first induction coil and the first temperature sensor, the control unit configured to control the first induction coil in response to the temperature of the food pan detected by the first temperature sensor such that temperature of the food pan is maintained at a targeted temperature.

Another embodiment of the invention relates to a rethermalizing station including a three-dimensional induction coil, and processing electronics configured to vary the output power of the induction coil in response to a comparison of a detected temperature and a targeted temperature.

Another embodiment of the invention relates to a rethermalizing station for rethermalizing or warming food items. The rethermalizing station includes a well defined by a side wall and a bottom, a food pan including a bottom and a sidewall, the food pan configured to be inserted into the well and to hold a food item, a three-dimensional side induction coil surrounding the side wall of the well, the side induction coil configured to warm the food item via inductive heating of the food pan, a bottom induction coil proximate to the bottom of the well, the bottom induction coil configured to warm the food item via inductive heating of the food pan, a bottom temperature sensor configured to detect a temperature of the bottom of the food pan, a side temperature sensor configured to detect a temperature of the sidewall of the food pan, and a control unit configured to control the power output of the side induction coil and the bottom induction coil in response to the temperature of the food pan detected by at least one of the bottom temperature sensor and the side temperature sensor such that temperature of the food pan is maintained at a targeted temperature.

Another embodiment of the invention relates to a rethermalizing station including a well defined by a side wall, a bottom assembly movable to vary the depth of the well, wherein the bottom assembly includes a base and a bottom induction coil supported by the base, a lift member configured to maintain the base in contact with a food pan inserted into the well, and a side induction coil surrounding the side wall of the well.

Another embodiment of the invention relates to a rethermalizing station including a well defined by a side wall, multiple bottom assemblies, wherein each bottom assembly is movable to vary the depth of a portion of the well and each bottom assembly includes a base and a bottom induction coil supported by the base, multiple lift members, each lift member coupled to one of the bottom assemblies and configured to maintain the base of the one of the bottom assemblies in contact with a food pan inserted into the portion of the well associated with the one of the bottom assemblies, and a side induction coil surrounding the side wall of the well.

Another embodiment of the invention relates to a cooking station for cooking food items. The cooking station includes a well defined by a side wall, a food pan configured to be inserted into the well and to hold a food item, a first induction coil surrounding the side wall of the well, the first induction coil configured to cook the food item via inductive heating of the food pan, a first temperature sensor configured to detect a temperature of the food pan, and a control unit coupled to the first induction coil and the first temperature sensor, the control unit configured to control the first induction coil in response to the temperature of the food pan detected by the first temperature sensor such that temperature of the food pan is maintained at a targeted cooking temperature.

Another embodiment of the invention relates to a cooking station including a three-dimensional induction coil, and processing electronics configured to vary the output power of the induction coil in response to a comparison of a detected temperature and a targeted cooking temperature.

Another embodiment of the invention relates to a cooking station for cooking food items. The cooking station includes a well defined by a side wall and a bottom, a food pan including a bottom and a sidewall, the food pan configured to be inserted into the well and to hold a food item, a three-dimensional side induction coil surrounding the side wall of the well, the side induction coil configured to cook the food item via inductive heating of the food pan, a bottom induction coil proximate to the bottom of the well, the bottom induction coil configured to cook the food item via inductive heating of the food pan, a bottom temperature sensor configured to detect a temperature of the bottom of the food pan, a side temperature sensor configured to detect a temperature of the sidewall of the food pan, and a control unit configured to control the power output of the side induction coil and the bottom induction coil in response to the temperature of the food pan detected by at least one of the bottom temperature sensor and the side temperature sensor such that temperature of the food pan is maintained at a targeted cooking temperature.

Another embodiment of the invention relates to a cooking station including a well defined by a side wall, a bottom assembly movable to vary the depth of the well, wherein the bottom assembly includes a base and a bottom induction coil supported by the base, a lift member configured to maintain the base in contact with a food pan inserted into the well, and a side induction coil surrounding the side wall of the well.

Another embodiment of the invention relates to a cooking station including a well defined by a side wall, multiple bottom assemblies, wherein each bottom assembly is movable to vary the depth of a portion of the well and each bottom assembly includes a base and a bottom induction coil supported by the base, multiple lift members, each lift member coupled to one of the bottom assemblies and configured to maintain the base of the one of the bottom assemblies in contact with a food pan inserted into the portion of the well associated with the one of the bottom assemblies, and a side induction coil surrounding the side wall of the well.

Another embodiment of the invention relates to a warming shelf including a body including a top surface, an induction coil supported by the body, a temperature sensor configured to detect a temperature of a food pan positioned on the top surface, and a control unit configured to control the power output of the induction coil in response to the temperature of the food pan detected by the temperature sensor such that temperature of the food pan is maintained at a targeted warming temperature.

Another embodiment of the invention relates to a warming shelf including an induction coil and processing electronics configured to vary the output power of the induction coil in response to a comparison of a detected temperature and a targeted temperature.

Another embodiment of the invention relates to a heated cabinet including a body defining an interior volume, a three-dimensional induction coil extending along the height of the interior volume, and a shelf positioned in the interior volume to divide the interior volume into multiple compartments.

Another embodiment of the invention relates to a heated cabinet including a body defining an interior volume, and a shelf including an induction coil, wherein the shelf is positioned in the interior volume to divide the interior volume into a plurality of compartments.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to FIGS. 1-4, a rethermalizing station 100 according to an exemplary embodiment is illustrated. The rethermalizing station 100 is configured to warm or rethermalize, but not cook, a food item by heating the food item to a specified temperature and then maintaining the food item at that specified temperature (e.g. a warming temperature of 155 degrees Fahrenheit for soup). Different food items may need to be warmed to different warming temperatures.

Figure 2:
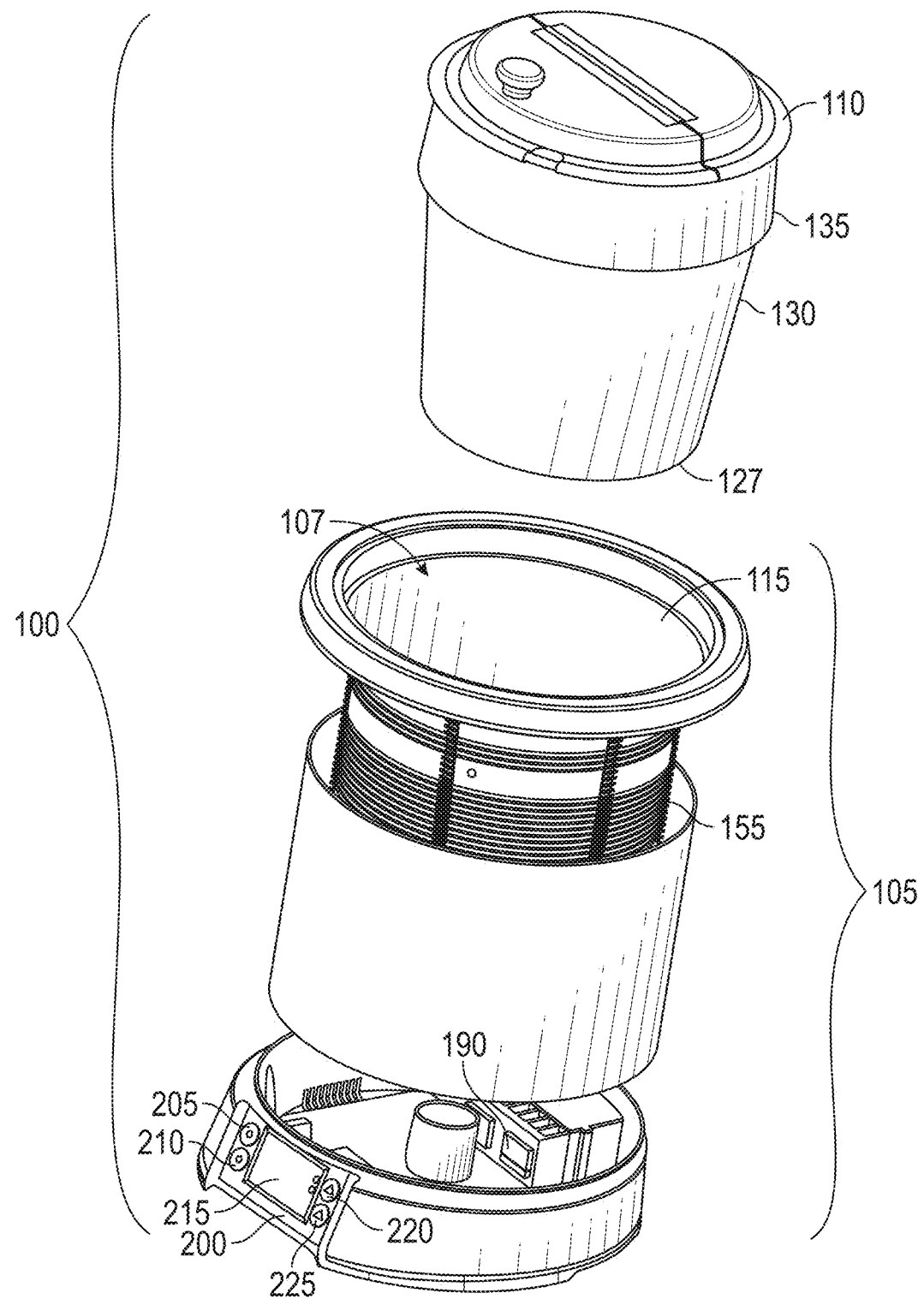
FIG. 2 is an exploded view of the rethermalizing station of FIG. 1.

As shown in FIG. 2, the rethermalizing station 100 includes a base 105 that defines a well 107 configured to hold a food pan 110. In some embodiments, the rethermalizing station 100 includes more than one well 107 and is therefore able to hold more than one food pan 110. The rethermalizing station 100 is shown as a countertop device, though the technology may also be incorporated into a floor-standing unit or station, or used in a drop-in unit. A drop-in unit is configured to be received by a cutout in a countertop, cabinet, or food service station. In some embodiments, the base 105 includes a rim that is configured and sized so that a user can grasp the rim as a handle for lifting or positioning the base 105. In some embodiments, the rim of the base 105 is configured and sized so that the base 105 can be positioned in an opening in a countertop with the rim contacting and supported by the countertop.

Figure 3:
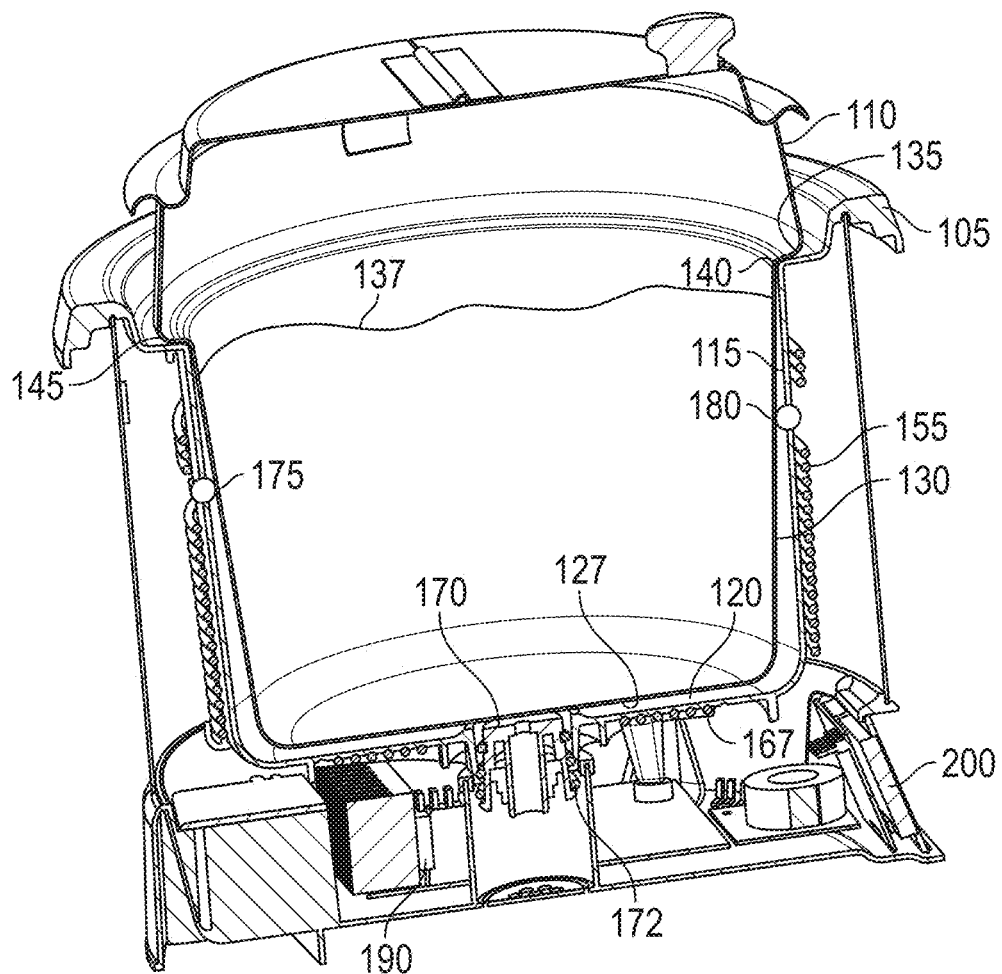
FIG. 3 is a section view of the rethermalizing station of FIG. 1.
Figure 4:
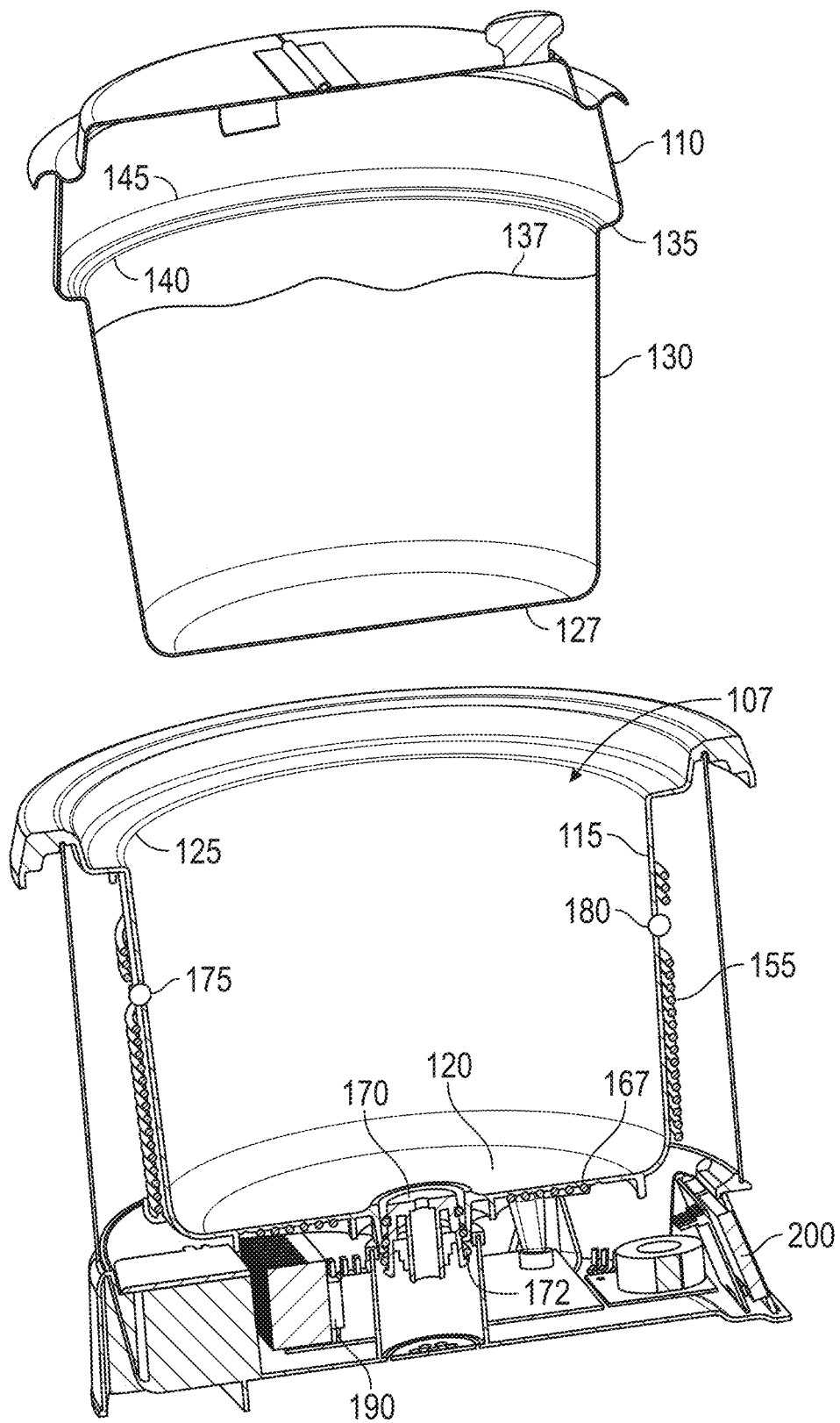
FIG. 4 is an exploded section view of the rethermalizing station of FIG. 1.
Figure 5:
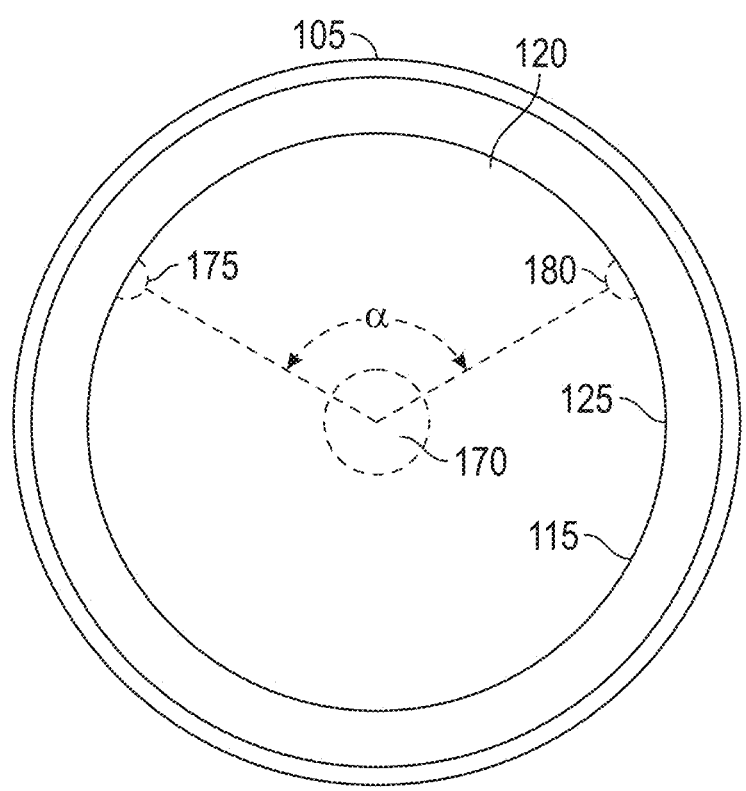
FIG. 5 is a top view of the well of the rethermalizing station of FIG. 1.

As shown in FIGS. 3-4, the well 107 defines an exterior or side wall 115 and a bottom 120. The exterior wall 115 has a perimeter 125 shaped to receive the food pan 110. The perimeter 125 can be circular (as shown in FIG. 5), a polygon, or other appropriate shapes. In some embodiments, the well 107 is sized to accept a particular size of food pan (e.g., a 7-quart or 11-quart food pan).

Figure 1:
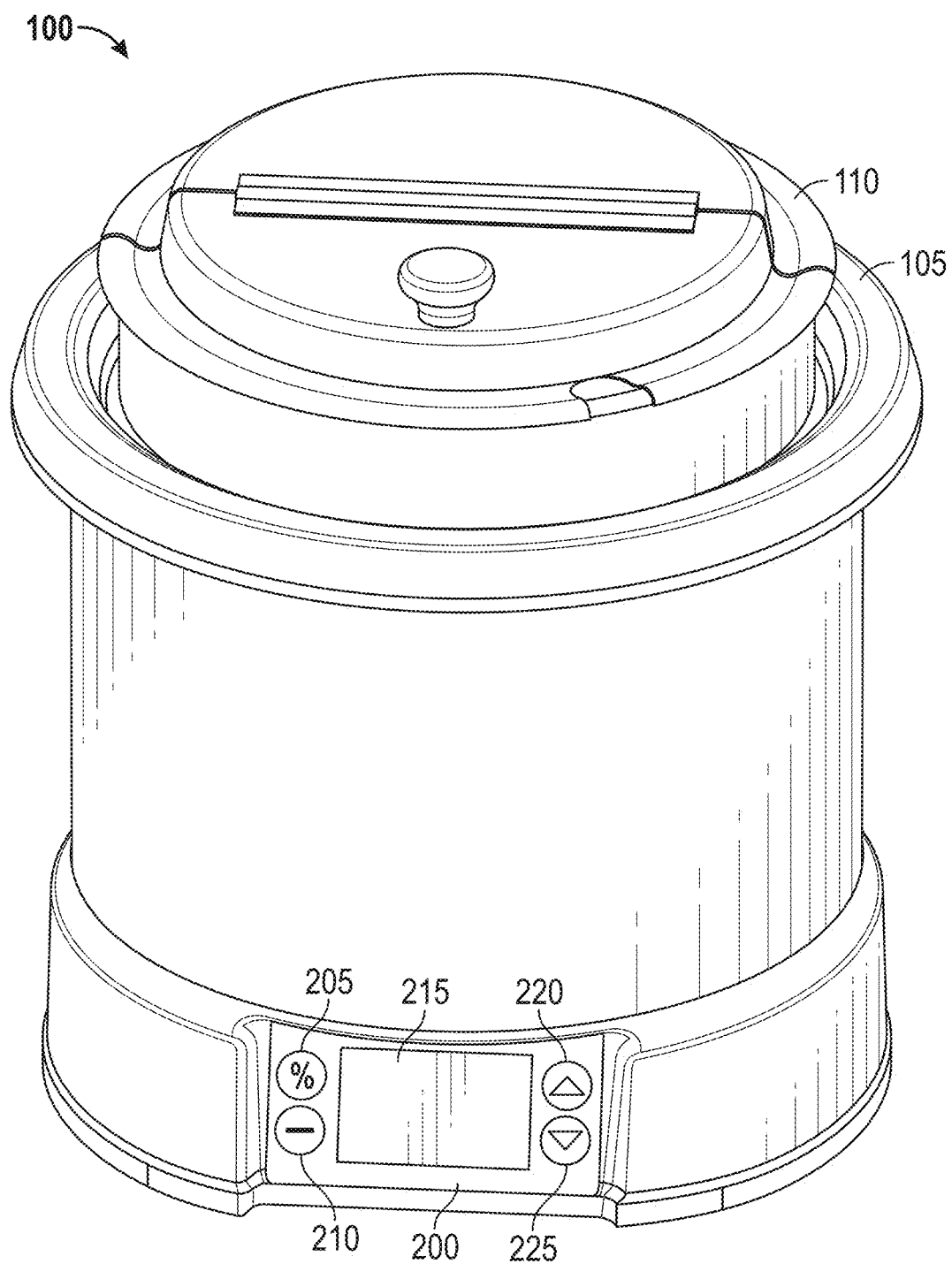
FIG. 1 is a perspective view of a rethermalizing station according to an exemplary embodiment.

As shown in FIGS. 2-4, the food pan 110 includes a bottom 127 and a sidewall that define a receptacle 130, and a lip 135. The receptacle 130 is configured to hold a food item 137. Examples of food items 137 include soups, stews, sauces, pasta dishes, and gravies. The lip 135 extends from the receptacle 130 so that the lip 135 overhangs a portion of the well 107 when the food pan 110 is inserted into the well 107 (as shown in FIG. 1). In some embodiments, the lip 135 rests on the base 105 and the bottom 127 of the food pan 110 is suspended above the bottom 120 of the well 107. The food pan 110 has an outer receptacle perimeter 140 proximate the lip 135 that has the same shape and substantially the same size as the well perimeter 125. The outer receptacle perimeter 140 can be circular, a polygon, or other appropriate shapes. The food pan 110 also has a lip perimeter 145. In some embodiments, the lip perimeter 145 has the same shape as the outer receptacle perimeter 140 (e.g., both circular or both polygons). In other embodiments, the lip perimeter 145 has a different shape than the outer receptacle perimeter 140. The food pan 110 is conductive (e.g., made of metal). In a preferred embodiment, the food pan 110 is made of magnetic stainless steel.

As shown in FIG. 3, the bottom 120 of the well 107 is located at a depth in the base 105 so that a substantial portion of the receptacle 130 of the food pan 110 is positioned in the well 107 when the food pan 110 is inserted into the well 107 so that the lip 135 rests on the rethermalizing station 100 and the bottom 127 of the food pan 110 is suspended above the bottom 120 of the well 107. In some embodiments, at least half of the receptacle 130 is positioned in the well 107.

As shown in FIGS. 2-4, the rethermalizing station 100 also includes a side induction coil 155. The side induction coil 155 is considered to be three-dimensional. That is, the side induction coil 155 is located along the exterior wall 115 of the well 107 to apply heat across multiple corresponding surfaces of the food pan 110. The side induction coil 155 is formed by multiple loops or turns and extends for coil depth along the well 107. In some embodiments, the coil depth is greater than the diameter of a single turn, but not greater than the well depth. The side induction coil 155 surrounds the exterior wall 115 of the well 107 and a coil perimeter is greater than the well perimeter 125.

The side induction coil 155 is configured to rethermalize or warm the food item 137 via inductive heating of the food pan 110. Because the side induction coil 155 surrounds the well 107, the food pan 110 will be inductively heated along the depth of the side induction coil 155 and about the receptacle 130 of the food pan 110. The turns of the side induction coil 155 can be a circle, a polygon, or other appropriate shapes. In some embodiments, the side induction coil 155 is considered to be a cylinder.

Referring to FIGS. 3-4, a bottom induction coil 167 is included proximate the bottom 120 of the well 107. The bottom induction coil 167 can be used alone or in combination with the side induction coil 155 to heat the food item 137 by inductively heating the bottom 127 of the food pan 110. In some embodiments, the side induction coil 155 and the bottom induction coil 167 are integrally formed as a single component so that the side induction coil 155 and the bottom induction coil 167 are electrically coupled together in series. In other embodiments, the side induction coil 155 and the bottom induction coil 167 are formed by multiple separate coils electrically coupled together in series. In some embodiments, the bottom induction coil 167 is replaced by a heating element (e.g., a resistive heating element, or other appropriate heating element). In other embodiments, the bottom induction coil 167 is omitted. For example, in a rethermalizing station suitable for use with hotel pans, the bottom induction coil would be omitted so that the same rethermalizing station could accept hotel pans of different depths.

In some embodiments, the side induction coil 155 is formed by multiple separate coils coupled together (e.g. an upper coil, a middle coil, and a lower coil). Such separate coils are able to be controlled individually to control the food item in warming zones within the food item located proximate each of the separate upper, middle, and lower coils. A side temperature sensor is located at the top of each the separate coils, so that the food pan temperature detected by each of these side temperature sensor is indicative of the food item temperature in each warming zone. Discrete control of the separate coils allows for precise control of food item temperature within each warming zone (e.g., to account for heating that could otherwise be uneven) and to shut off individual coils when the depth of the food item drops below the bottom of one of the coils, thereby conserving energy and preventing possible burning or scorching of any food item left on the walls of the food pan above the main body of the food item. In some embodiments, the bottom induction coil 167 is also divided into multiple coils in a similar manner.

As shown in FIGS. 3-5, the rethermalizing station 100 also includes a bottom temperature sensor 170 positioned proximate to the bottom 120 of the well 107. The bottom temperature sensor 170 is configured to detect a temperature of the food pan 110 proximate the bottom temperature sensor 170, which is indicative of a temperature of the food item 137 proximate the bottom temperature sensor 170. In some embodiments, the bottom temperature sensor 170 is biased away from the bottom 120 by a biasing member or spring 172 so that the bottom temperature sensor 170 is held against the bottom 127 of the food pan 110 without the food pan 110 contacting the bottom 120 of the well 107. Direct contact between the bottom temperature sensor 170 and the food pan 110 allows for a more accurate temperature measurement and for quicker response times in detecting changes in temperature than the temperature sensors used in known food serving stations. In known food serving stations, the temperature sensor is separated from the food pan by a piece of glass or another insulator and, in the case of steam bath warming stations, separated from the food in the food pan by both the food pan itself and the steam bath. In some embodiments, the bottom temperature sensor 170 is configured to detect a temperature of the food pan 110 without direct contact with the food pan 110. For example, an infrared (IR) or other remote temperature sensor could be used to detect the temperature of the food pan 110. An IR sensor would most likely be appropriate for use in combination with food pans having a non-stick or other coating. In some embodiments, the bottom temperature sensor 170 is not biased away from the bottom 120. In some embodiments, the bottom temperature sensor 170 is mounted flush with the bottom 120 (e.g. for direct contact sensors), recessed with respect to the bottom 120 (e.g., for non-contact sensors), or proud with respect to the bottom 120 (e.g., for direct contact sensors). In some embodiments, the bottom temperature sensor 170 is located in the center of the bottom 120.

As shown in FIGS. 3-5, in some embodiments, the rethermalizing station 100 also includes two side temperature sensors 175 and 180. In other embodiments, more or fewer side temperature sensors are included. The side temperature sensors 175 and 180 are positioned proximate the exterior wall 115 of the well 107 and at a different elevation than the bottom temperature sensor 170 and are configured to detect a temperature of the food pan 110 proximate the respective sensor 175 and 180, which is indicative of a temperature of the food item 137 proximate the respective sensor 175 and 180. In some embodiments, the side temperature sensors 175 and 180 are positioned to be at about the midpoint of the receptacle 130 of the food pan 110 when the food pan 110 is inserted into the well 107. In this way, the side temperature sensors 175 and 180 are able to detect a temperature indicative of the food item temperature proximate the sensors when the food pan 110 is between full and half-full. The side temperature sensors 175 and 180 are configured to directly contact the food pan 110. As shown in FIG. 5, the side temperature sensors 175 and 180 are spaced apart from one another, for example by an angle α with a vertex along an axis extending through the center of the well 107. The angle α is such that a food pan 110 inserted into the well 107 will always be in contact with one of the side temperature sensors 175 and 180 without regard for how out-of-round or otherwise out-of-shape, the food pan is 110. This is because the well 107, the food pan 110, and the angle α are sized such that a food pan 110 that was so out-of-shape so as to not contact both of the side temperature sensors 175 and 180 will not fit into the well 107. In some embodiments, the angle α is about 60 degrees. In some embodiments, the side temperature sensors 175 and 180 are configured to remotely detect a temperature of the food pan 110. In some embodiments, one or more of the temperature sensors 170, 175, and 180 are thermistors.

As shown in FIGS. 2-4, the rethermalizing station 100 also includes control unit 190 including processing electronics configured to control the operation of the induction coils 155 and 167 and other components in response to various inputs, including the temperatures of the food pan 110 detected by the various temperature sensors described above (e.g. temperature sensors 170, 175, and 180) and inputs from a user interface 200. The control unit 190 is coupled to the induction coils 155 and 167 and any input or output devices found in the specific embodiment of the rethermalizing station 100. The control unit 190 can include a processor and memory device. The processor can be implemented as a general purpose processor, an application specific integrated circuit (ASIC), one or more field programmable gate arrays (FPGAs), a group of processing components, or other suitable electronic processing components. Memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. Memory device may be or include volatile memory or non-volatile memory. Memory device may include database components, object code components, script components, or any other type of information structure for supporting the various activities and information structures described in the present application. According to an exemplary embodiment, memory device is communicably connected to processor via processing circuit and includes computer code for executing (e.g., by processing circuit and/or processor) one or more processes described herein.

The control unit 190 is configured to control the induction coils 155 and 167 in response to various operating schemes. A power supply (not shown) is coupled to the induction coils 155 and 167 to supply power to the induction coils 155 and 167. When powered, an alternating current runs through the induction coils 155 and 167, thereby heating the conductive food pan 110 by electromagnetic induction. Heating the food pan 110 heats the food item. In embodiments where the food pan 110 is made from magnetic stainless steel, the alternating current has a frequency within a range of about 20 to 25 kHz. The power output of the induction coils 155 and 167 can be varied between 0 watts (e.g., off) and 800 watts (e.g., full power). For example, the power output of the induction coils 155 and 167 may varied between 90 watts and 720 watts. The power output of the induction coils 155 and 167 can be varied by varying the current supplied to the induction coils 155 and 167. For example, the current supplied to the induction coils 155 and 167 can vary between about 0.75 amps and about 7.0 amps. In some embodiments, a current of about 0.75 amps results in a power output of about 100 watts and a current of about 6.8 amps results in a power output of about 800 watts. It is believed that the ability to produce relatively low power outputs (e.g., about 100 watts), from constantly on (i.e., not duty-cycled) induction coils 155 and 167 is because the number of turns in the side induction coil 155 is greater than the number of turns in the bottom induction coil 167. For example, in some embodiments, the side induction coil 155 includes seventeen turns and the bottom induction coil 167 includes fourteen turns.

In known induction heating serving stations using a flat or two-dimensional induction coil, the output power of the induction coil is varied by implementing a duty cycle that sequentially turns the induction coil on and off. When the induction coil is on, a relatively high current (e.g. 10 amps) is supplied to the induction coil. By varying the duration of the on cycles and the off cycles, the total power output over a period of time can be varied. However, this duty cycle control can result in unwanted food item conditions. For example, soup warmed to a targeted warming temperature using duty cycle control can be heated to a temperature where the food item reaches a visible simmer or boil when the duty cycle is in an "on" portion and then stops boiling when the duty cycle is in an "off" portion. This cycle of starting and stopping boiling of the food item is because the duty cycle control is unable to consistently maintain the temperature of the food item at the targeted warming temperature, and instead continually bounces above and below the targeted warming temperature. This cyclical boiling is not only visually unappealing to consumers, but can also burn, scorch, or otherwise waste the food item.

The user interface 200 provides user inputs to the control unit 190 to control operation of the rethermalizing station 100. The user interface 200 allows the user to adjust various settings (e.g., the targeted warming temperature, the targeted temperature difference indicative of stratified temperatures, etc.) and activate one or more preset operating modes (e.g., a warming mode and a rethermalizing mode). The user interface 200 can be a series of buttons and a display screen, a touch screen, a series of buttons or switches and indicator lights, or any other conventional user interface capable of providing user inputs to the control unit 190 and displaying the selected user inputs and other information to the user. In some embodiments, the user interface 200, or one or more components of the user interface 200 (e.g., a display screen, a series of buttons or switches, etc.) is angled relative to vertical to make the user interface 200 easier for a user to view. The user interface 200 may include a speaker for providing audible indicators or warnings (e.g., a buzzer, a beeper, a voice recording, etc.). In some embodiments the user interface 200 may be mounted separately from the rest of the rethermalizing station 100. For example, for a drop-in rethermalizing station, the user interface 200 may be mounted inside a cabinet and therefore not be visible to a user when the cabinet door is closed. In situations like this, audible indicators are particularly valuable because a visible indicator may not be readily visible to the user. For example, an audible indicator may be used alone or in combination with a visual indicator for indicating a bad pan, an over temperature warning, that the food item needs attention (e.g., stirring), or other appropriate message about the status of the rethermalizing station that need to be communicated to a user.

In some embodiments, in the rethermalizing mode, the induction coils 155 and 167 are operated at the maximum output power in order to quickly heat a refrigerated food item 137 to a targeted warming temperature. In some embodiments, in the warming mode, the induction coils 155 and 167 are operated at the minimum power output required to maintain the targeted warming temperature. In the warming mode, the power output can be reduced linearly, proportionally in response to a temperature difference between a detected temperature and the targeted warming temperature, in a step-wise fashion (e.g., full power, half power, quarter power, minimum maintainable power), or according to another appropriate algorithm.

The control unit 190 will automatically switch between rethermalizing mode and warming mode as needed to ensure that the detected temperature does not overshoot the targeted warming temperature while still maintaining the food pan 110 at the targeted warming temperature. For example, when the rethermalizing station 100 is set to rethermalizing mode and a refrigerated food item with a starting temperature of about 35 degrees Fahrenheit is to be rethermalized to 165 degrees Fahrenheit, the rethermalizing station 100 would operate in rethermalizing mode (i.e., induction coils 155 and 167 at maximum output power) until the detected temperature is a predetermined amount below the targeted warming temperature (e.g., 1 degree Fahrenheit, 2 degrees Fahrenheit, 3 degrees Fahrenheit, etc.), at which point, the rethermalizing station 100 switches to warming mode (e.g., induction coils 155 and 167 operated at minimum output power required to maintain targeted warming temperature) to slow the rate at which the food item is warmed so as to not overshoot the targeted warming temperature of 165 degrees Fahrenheit. The rethermalizing station 100 is capable of rethermalizing a refrigerated food item from 35 degrees Fahrenheit to 165 degrees Fahrenheit in about 30 minutes, which is well below an accepted industry standard of two hours for such a rethermalizing cycle. With the rethermalizing station 100 in warming mode, if the detected temperature were to drop a predetermined amount below the targeted warming temperature (e.g., 1 degree Fahrenheit, 2 degrees Fahrenheit, 3 degrees Fahrenheit, etc., for example, if refrigerated or colder food item was added to the warm food item in the warming station), the rethermalizing station 100 would automatically switch from warning mode to rethermalizing mode, and then, when appropriate, back to warming mode, to quickly return the food item to the targeted warming temperature.

The detected temperature used for comparison with the targeted warming temperature can be detected by one or more of the temperature sensors discussed above. For example, the detected temperature could be detected by the bottom temperature sensor 170, one of the side temperature sensors 175 and 180, or be an average of the temperatures detected by at least two of temperature sensors 170, 175, and 180.

The control unit 190 is configured to implement various control schemes in response to various inputs. In particular, various control schemes can be implemented in response to one or more detected temperatures (e.g., as detected by the various temperature sensors discussed above), differences between two or more detected temperatures, and/or differences between one or more detected temperatures and the targeted warming temperature. For example, when the temperature difference between one of the side temperature sensors 175 and 180 and the bottom temperature sensor 170 is greater than a predetermined amount (e.g., 30 degrees Fahrenheit) indicative of unwanted temperature stratification within the food item 137 (e.g., upper portion of the food item significantly hotter than the lower portion of the food item), the control unit 190 will activate an indicator that alerts the user that the food item 137 needs attention (e.g., stirring). By monitoring the temperature difference within the food item 137 in this way, food waste due to overheating of the food item 137 may be avoided. The indicator may be a light, an audible alarm, message, or other indication on the user interface 200, or other appropriate indicator. In some embodiments, an indicator may be periodically turned on in response to a timer to indicate a need for regular attention by the user (e.g., every 30 minutes).

As another example, the control unit 190 will turn off the induction coils 155 and 167 if the temperature detected by one or more of the bottom temperature sensor 170 and the side temperature sensors 175 and 180 exceeds an overheat temperature (e.g., 200 degrees Fahrenheit) that is indicative of the food item overheating, burning, or scorching. This prevents food waste from overheating the food item. In some embodiments, after the detected temperature drops sufficiently below the overheat temperature, the induction coils 155 and 167 are turned back on in the appropriate mode.

A magnetic stainless steel food pan (i.e., an induction-ready food pan) may be preferred for use with the rethermalizing station 100 and is considered to be a good pan. A non-magnetic or not sufficiently magnetic metal food pan (e.g., an aluminum food pan) may not be suitable for use with the rethermalizing station 100 and is considered to be a bad pan. A bad pan may cause the rethermalizing station 100 to not work as intended (e.g., heating the pan and food product above the desired temperature).

In some embodiments, the control unit 190 will shut off the induction coils 155 and 167 in response to a relatively high current through the induction coils 155 and 167 that is indicative of food pan 110 not intended for use with the rethermalizing station 100 (i.e. a "bad" pan). A food pan with a relatively low resistance will not work in combination with the induction coils 155 and 167 to inductively heat the food pan and the low resistance will cause the current through induction coils 155 and 167 to increase. In some embodiments, this current increase above the acceptable maximum current for a good pan will cause the induction coils 155 and 167 to be shut off and will turn on a bad pan indicator.

Another way to distinguish between good pans and bad pans is via an index number indicative of a sensed current or currents. A bad pan will result in a higher current through the induction coils 155 and 167 than a good pan. This difference can be detected to distinguish between good pans and bad pans. The control unit 190 is configured to calculate the index number and then compare the index number to a threshold index number to distinguish between good pans and bad pans. The index number for a specific food pan may be determined by an index number test sequence in which a voltage pulse is sent through the induction coils 155 and 167 and the resulting current through the induction coils 155 and 167 is then measured with a current sensor. The value of the sensed coil current is then divided by the value of the input current to the rethermalizing station 100. The input current can be detected by a current senor or may be known based on the electrical characteristics of the rethermalizing station 100 and/or the power supply used to power the rethermalizing station 100 (e.g., a standard 120 volt, 60 Hz U.S. outlet). A bad pan is identified when the index number resulting from the index number test sequence is above the threshold index number. Index numbers indicative of bad pans are above the threshold index number because the coil current with a bad pan is greater than the coil current with a good pan. A good pan will have an index number below the threshold index number. In some embodiments, the threshold index number is 2.36.

The control unit 190 is configured to implement the index number test sequence and a bad pan check module in which the results of the index number test sequence are compared to threshold index number. In some embodiments, the index number test sequence is implemented in response to an operating characteristic of the rethermalizing station 100. For example, in some embodiments, the index number test sequence is implemented with then the current frequency in the induction coils 155 and 167 is equal to or above 46 kHz. In some embodiments, when a bad pan is detected a bad pan indicator is activated. The bad pan indicator may be a light on the user interface 200, a symbol or message on the display 215, or an audible indication (e.g., a buzzer, a beeper, a voice recording, etc.). In some embodiments, when a bad pan is detected the induction coils 155 and 167 are turned off. In some embodiments, when a bad pan is detected, the induction coils 155 and 167 are turned off and a bad pan indicator is activated.

A bad pan can also be distinguished from a good pan based on the resonant frequency of the induction coils 155 and 167. In use in the rethermalizing station 100, the good pan results in a first resonant frequency of the induction coils 155 and 167 (e.g., about 17-21 kHz). A bad pan results in a second resonant frequency higher than the first resonant frequency. A resonant frequency outside of an acceptable range (e.g., a frequency range associated with good pans) may be used to indicate a bad pan.

In some embodiments, a good pan suitable for use with the rethermalizing station 100 is identified by a groove or other indicia formed in the lip 135 of the food pan 110. This indicia is readily visible to a user when the food pan 110 is inserted into the well 107 and provides a visible confirmation to the user that a good pan is being used.

In some embodiments, the control unit 190 controls the power output of the side induction coil 155 proportionally to a difference between the detected temperature of the food pan 110 (e.g., as detected by bottom temperature sensor 170) and the targeted warming temperature. Such proportional control helps to prevent spikes in the temperature of the food item 137, thereby avoiding unwanted conditions of the food item 137 (e.g., causing the soup to boil).

The rethermalizing station 100 provides several benefits when compared to conventional steam bath or hot air warming stations. For example, there is no need to fill and refill a water reservoir; the rethermalizing station 100 provides a dry heat. This reduces labor and makes the rethermalizing station 100 less costly to operate. As another example, there is no need to provide air much hotter than the targeted warming temperature (e.g., using 300 degree Fahrenheit air to heat soup to a 160 degrees Fahrenheit targeted warming temperature). This is more energy efficient, thereby reducing operating costs. Also, this results in a device operating at lower temperatures. The variable power output of the induction coils 155 and 167 allows the rethermalizing station 100 to hold extremely consistent food item temperatures. This consistent temperature reduces food waste by reducing burning, scorching, and other damage to the food item 137 caused by overheating or inconsistent heating of the food item 137.

As shown in FIGS. 1-2, in some embodiments, the user interface 200 includes an on/off actuator 205, a function actuator 210, a display 215, a setting up actuator 220, and a setting down actuator 225. With the rethermalizing station 100 off, pressing the on/off actuator 205 will turn the warming station on and cause a welcome message to appear on the display 215. With the rethermalizing station 100 on, pressing the on/off actuator 205 will turn the rethermalizing station 100 off.

With the rethermalizing station 100 on, pressing the function actuator 210 once initiates warming mode and provides an indicator (e.g., the word "warm") on a portion of the display 215. The user can adjust one or more settings in warm mode by pressing the setting up actuator 220 or the setting down actuator 225. In some embodiments, there is no need to "enter" the selected setting; the control unit 190 will do so after a set period of time has passed without an actuator being pushed. In other embodiments, an enter actuator may be used to "enter" the selected setting. Settings may include the targeted warming temperature as measured in degrees Fahrenheit or Celsius or preset targeted warming temperatures, each of which is associated with a type of food item 137 (e.g., chili, soup (regular), soup (cream), macaroni and cheese, etc.). Indicators for the various settings are shown on a portion of the display 215. In some embodiments, the control unit 190 will remember the user selected settings for warm mode so that warm mode setting will not need to reentered by the user if the rethermalizing station 100 is cycled off and then on.

In some embodiments, the temperature of the food item 137 is shown on the display 215. This may require a calibration or correction of the food pan temperature as detected by one or more temperature sensors that detect the temperature of the food pan 110 (e.g., temperature sensors 170, 175, and 180). Such a calibration accounts for any expected difference between the detected food pan temperature and the temperature of the food item itself (e.g., due to the typical rate of heat transfer in a particular food item). Different calibrations may be necessary for different types of food items. For example, a different calibration may be needed for each of water, macaroni-and-cheese, cream-based soups, and stock-based soups. To display the appropriate food item temperature, the user would select the type of food item via the user interface 200 and the control unit 190 would implement the appropriate calibration so that the appropriately calibrated food item temperature is displayed. The calibrations may be preset at the factory or set by a user in the field. For example, the user may need to measure the temperature of a specific food item with a thermometer or other means and then enter this value into the user interface 200 so that the control unit 190 can compare the user-measured food item temperature to the detected food pan temperature to determine the appropriate calibration. This calibration for the specific food item could then be stored by the control unit 190.

With the rethermalizing station 100 on, pressing the function actuator 210 twice initiates rethermalizing mode and provides an indicator (e.g., the word "retherm") on a portion of the display 215. The user can adjust one or more settings in rethermalizing mode by pressing the setting up actuator 220 or the setting down actuator 225. In some embodiments, there is no need to "enter" the selected setting; the control unit 190 will do so after a set period of time has passed without an actuator being pushed. In other embodiments, an enter actuator may be used to "enter" the selected setting. Settings may include the targeted rethermalizing temperature as measured in degrees Fahrenheit or Celsius or preset targeted rethermalizing temperatures. Additionally, in some embodiments, the user is able cancel rethermalizing mode through use of a cancel setting. Indicators for the various settings are shown on a portion of the display 215. In some embodiments, the control unit 190 will not remember the user selected settings for rethermalizing mode so rethermalizing mode settings will need to reentered by the user if the rethermalizing station 100 is cycled off and then on. Rethermalizing mode is suitable for use with food items 137 that are refrigerated when first introduced to the rethermalizing station 100 and need to be rethermalized from refrigerated to a targeted warming temperature.

With the rethermalizing station 100 on, the user interface 200 can be placed in a lock mode to disable the various actuators of the user interface 200 to prevent the mode being changed (e.g., from warming mode to rethermalizing mode or vice versa) and to prevent the settings from being changed (step 355). In some embodiments, lock mode is initialized by pressing the on/off actuator 205 and the setting down actuator 225 at the same time for a duration of three seconds. The rethermalizing station 100 will remember lock mode even if the rethermalizing station 100 is cycled off and then on. To unlock the user interface 200 and exit lock mode, the on/off actuator 205 and the setting down actuator 225 are pressed at the same time for a duration of three seconds.

Figure 6:
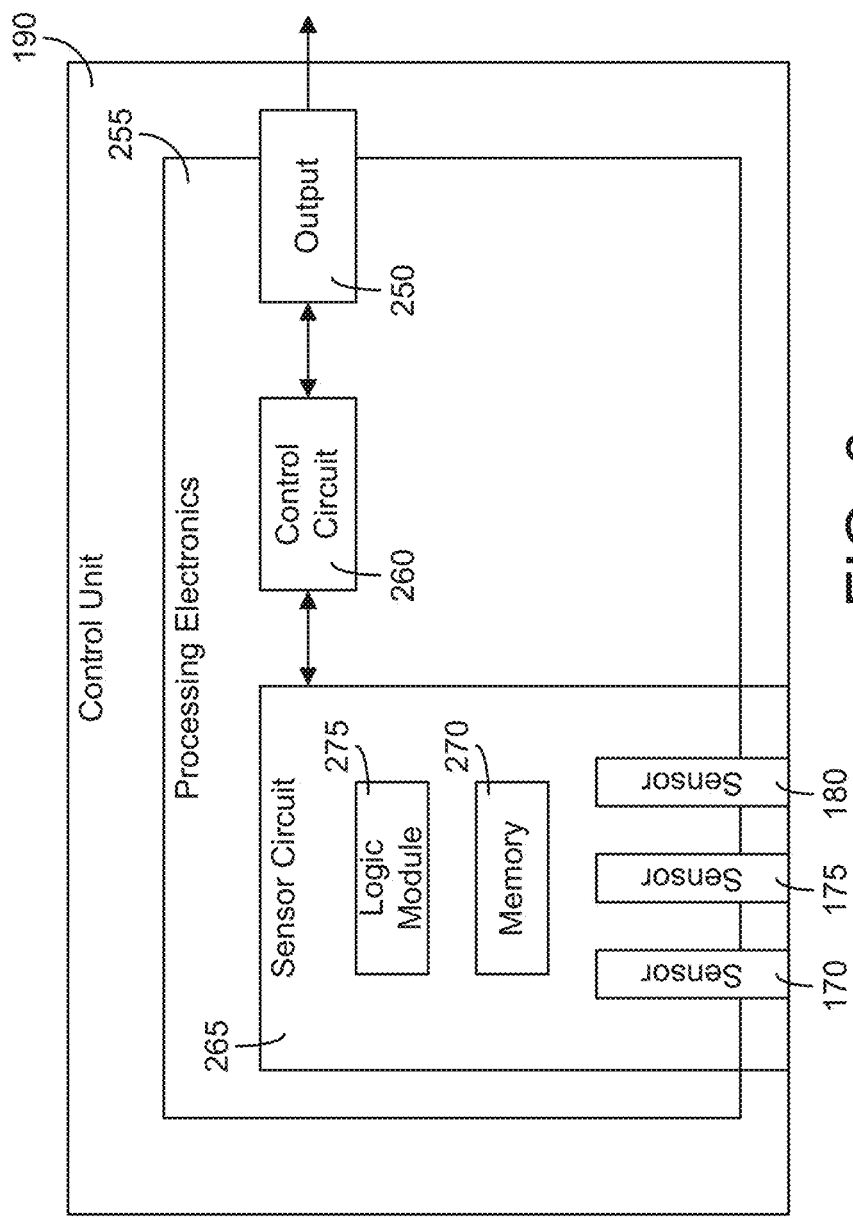
FIG. 6 is a detailed block diagram of the control unit of the rethermalizing station of FIG. 1, according to an exemplary embodiment.

Referring now to FIG. 6, a detailed block diagram of the control unit 190 is shown, according to an exemplary embodiment. The control unit 190 is generally configured to include circuitry configured with an algorithm to control the power output of the inductions and thereby control the temperature of the food item, an algorithm configured to prevent burning the food item, and/or other algorithms for allowing the control unit 190 to send and receive commands or information related to the operation of the rethermalizing station 100. The control unit 190 includes an output 250 configured to controllably switch on, increase, decrease, or switch off the output power of the side induction coil 155 and the bottom induction coil 167. The various algorithms or programs implemented by the control unit 190 can be loaded into the control unit 190 via a communication port (e.g. a USB port, a micro-USB port, a mini-USB port, RS-232 port, wireless receiver, etc.).

The control unit 190 also includes processing electronics 255. Processing electronics 255 generally utilizes electronics circuits and components (e.g., control circuits, relays, etc.) to effect the control activities described herein. In the example shown in FIG. 6, processing electronics 255 is embodied as a circuit (spread over one or more printed circuit boards) including a control circuit 260. Control circuit 260 receives and provides data or control signals from/to the output 250 and a sensor circuit 265. Control circuit 260 is configured to cause the side induction coil 155 and the bottom induction coil 167 of the rethermalizing station 100 to turn on and off or to vary their output power via control signals sent to output 250. For example, control circuit 260 can make a determination that an "on" or "off" signal should be sent to output 250 based on inputs received from sensor circuit 265. Sensor circuit 265 includes inputs from temperature sensors 170, 175, and 180 and memory 270. Sensor circuit 265 may include inputs from one or more current sensors. Such a current sensor or current sensors may measure the current in one or both of the induction coils 155 and 167 and/or the input current to the rethermalizing station 100. For example, based on temperatures detected by temperature sensors 170, 175, and 180 and sensor circuit 265, and a targeted temperature set point stored in memory 270, a logic module 275 may determine that control circuit 260 should change states, such that output 250 changes the output power of the side induction coil 155 and the bottom induction coil 167. Other control decisions, logic and activities provided by the control unit 190 and the components thereof are described below and with reference to other Figures.

Referring to FIGS. 7-12, an exemplary control scheme for the rethermalizing station 100 will be described in more detail. The control unit 190 is configured to effect at least four modes: (1) a low temperature mode, where the food item is well below a targeted temperature; (2) an over temperature mode, where the food item is well above the targeted temperature; (3) a keep warm mode, where the food item is at or close to the targeted temperature; and (4) a burning prevention mode, where the maximum output power of the induction coil is limited to prevent burning the food item.

Figure 7:
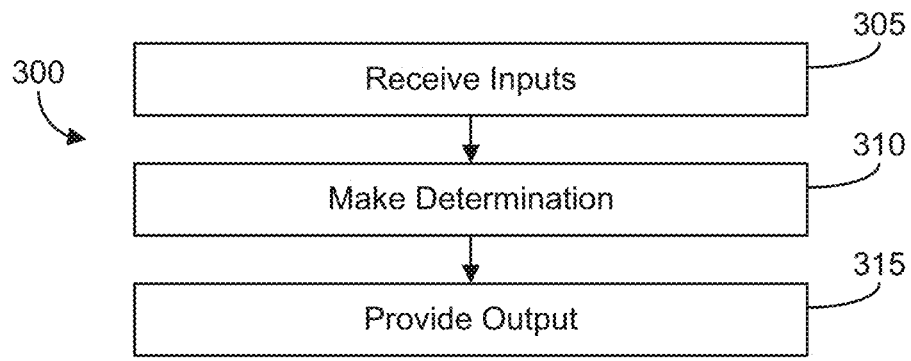
FIG. 7 is a flow chart of a process for controlling a rethermalizing station, according to an exemplary embodiment.

Referring to FIG. 7, a flow chart of a process 300 for controlling the side induction coil 155 and the bottom induction coil 167 is shown, according to an exemplary embodiment. The process 300 includes receiving inputs from the temperature sensors 170, 175, and 180 indicative of the temperature detected by each sensor and from the memory 270 indicative of a temperature set point or other user-selected input (step 305). Once received, the processing electronics 255 determines whether the received inputs represent a condition of the food item that should be acted upon (e.g., by changing the output power of the side induction coil 155 and the bottom induction coil 167) (step 310). The processing electronics 255 then sends the appropriate control signal to the output 250 (e.g., to change the output power of the side induction coil 155 and the bottom induction coil 167) (step 315).

Figure 8:
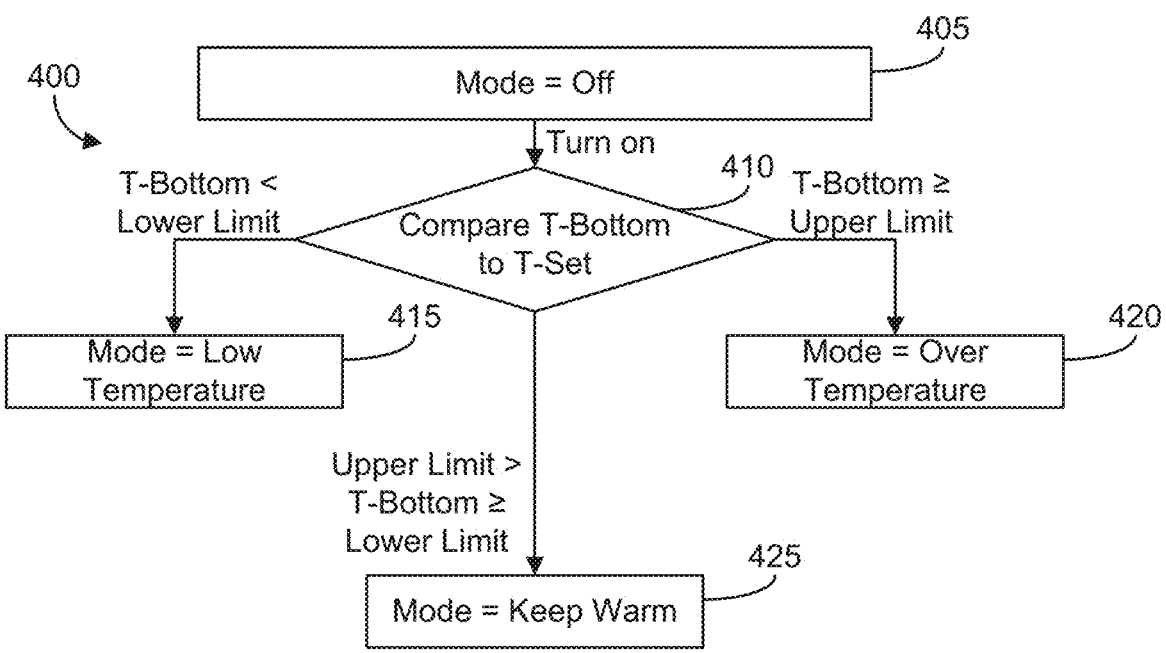
FIG. 8 is a flow chart of a process for providing an initial mode assignment for controlling a rethermalizing station, according to an exemplary embodiment.

Referring to FIG. 8, a flow chart of a process 400 for providing an initial mode assignment when the rethermalizing station 100 is turned on is shown, according to an exemplary embodiment. Process 400 begins at step 405 where the mode is set to off. At step 410, the temperature detected by the bottom temperature sensor 170 ("T-Bottom") is compared to a user-selected targeted temperature that will provide the desired food item temperature ("T-Set"). When T-Bottom is less than a lower limit relative to the targeted temperature, the mode is set to the low temperature mode (step 415). The lower limit is some percentage less than 100 of T-Set (e.g., T-Set minus 3° C.). When T-Bottom is greater than or equal to an upper limit relative to the targeted temperature, the mode is set to the over temperature mode (step 420). The upper limit is some percentage greater than 100 of T-Set (e.g., T-Set plus 2° C.). When T-Bottom is less than the upper limit and greater than or equal to the lower limit, the mode is set to the keep warm mode (step 425). The low temperature mode is configured to quickly heat a food item that is at a temperature below the lower limit to the targeted temperature by operating the side induction coil 155 and the bottom induction coil 167 at the maximum output power (e.g., 800 Watts or 100% power) or near the maximum output power (e.g., 600 Watts or 75% power). The over temperature mode is configured to provide minimal heat to a food item that is at a temperature above the upper limit to allow the temperature to return to the targeted temperature by operating the side induction coil 155 and the bottom induction coil 167 at a minimum output power (e.g. off, 1% power). The keep warm mode is configured to provide the heating necessary to maintain the food item at or near the targeted temperature by varying the output power of the side induction coil 155 and the bottom induction coil 167 between the maximum output power (e.g., 100% power) and the minimum output power (e.g. 1% power). The burning prevention mode is configured to limit the maximum output power of the side induction coil 155 and the bottom induction coil 167, when a temperature detected by one of the side temperature sensors 175 and 180 exceeds a burn warning temperature (e.g., 99° C.). When the burning prevention mode is activated, the maximum output power set by the burning prevention mode limits the maximum output power available in any of the other three modes of operation.

Figure 9:
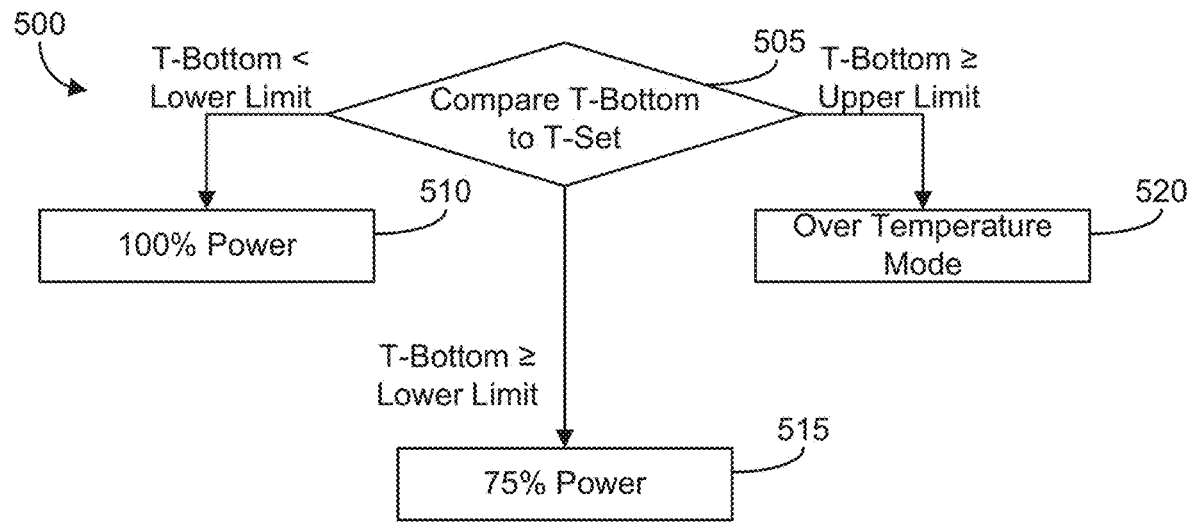
FIG. 9 is a flow chart of a process for a low temperature mode of operation for a rethermalizing station, according to an exemplary embodiment.

Referring to FIG. 9, a flow chart of a process 500 of the low temperature mode is shown, according to an exemplary embodiment. Process 500 beings at step 505 with a comparison of T-Bottom to T-Set. When T-Bottom is less than a low temperature mode lower limit (e.g., T-Set plus 1° C.), the output power of the side induction coil 155 and the bottom induction coil 167 ("coil output power") is set to 100% power (e.g., 800 Watts) (step 510). When T-Bottom is greater than or equal to the low temperature mode lower limit, the coil output power is set to a reduced power such as 75% power (e.g., 600 Watts) (step 515). When T-Bottom is greater than or equal to a low temperature mode upper limit (e.g., T-Set plus 3° C.), the mode changes to the over temperature mode (step 520).

Figure 10:
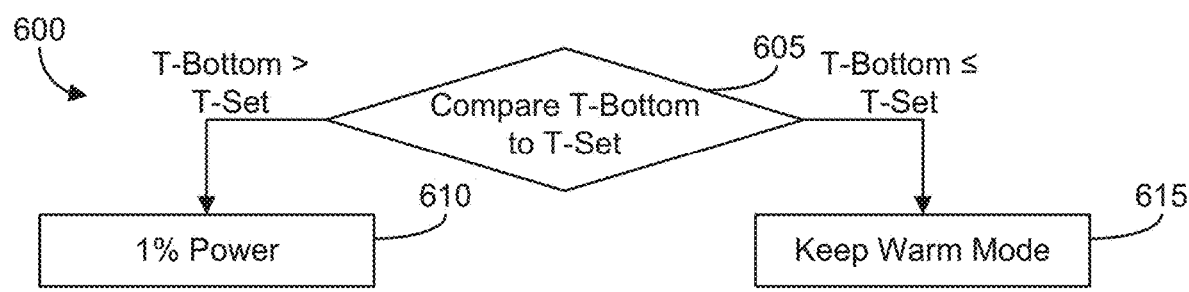
FIG. 10 is a flow chart of a process for an over temperature mode of operation for a rethermalizing station, according to an exemplary embodiment.

Referring to FIG. 10, a flow chart of a process 600 of the over temperature mode is shown, according to an exemplary embodiment. Process 600 begins at step 605 with a comparison of T-Bottom to T-Set. When T-Bottom is greater than T-Set, the coil output power is set to a minimum output power such as 1% power (e.g., 8 Watts) (step 605). When T-Bottom is less than or equal to T-Set, the mode changes to the keep warm mode (step 610).

Figure 11:
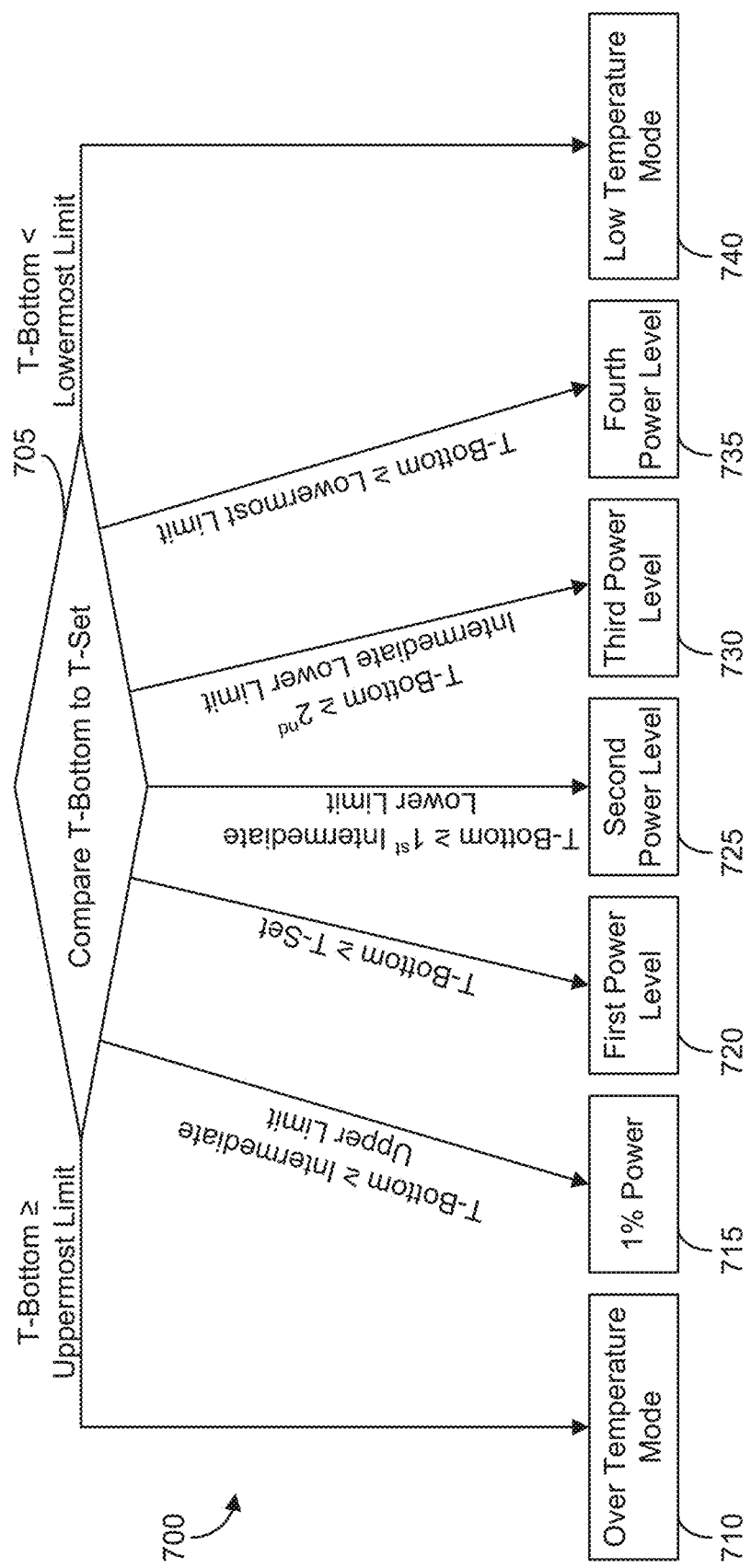
FIG. 11 is a flow chart of a process for a keep warm mode of operation for a rethermalizing station, according to an exemplary embodiment.

Referring to FIG. 11, a flow chart of a process 700 of the keep warm mode is shown, according to an exemplary embodiment. Process 700 begins at step 705 with a comparison of T-Bottom to T-Set. When T-Bottom is greater than or equal to an uppermost limit (e.g., T-Set plus 2° C.), the mode changes to the over temperature mode (step 710). When T-Bottom is greater than or equal to an intermediate upper limit (e.g., T-Set plus 1° C.), the coil output power is set to a minimum output power such as 1% power (e.g., 8 Watts) (step 715). When T-Bottom is greater than or equal to T-Set, the coil output power is set to a first power level (e.g., T-Set multiplied 3.2 Watts) (step 720). When T-Bottom is greater than or equal to a first intermediate lower limit (e.g., T-Set minus 1° C.), the coil output power is set to a second power level greater than the first power level (e.g., T-Set multiplied by 4.8 Watts) (step 725). When T-Bottom is greater than or equal to a second intermediate lower limit (e.g., T-Set minus 2° C.), the coil output power is set to a third power level greater than the second power level (e.g., T-Set multiplied by 6.4 Watts) (step 730). When T-Bottom is greater than or equal to a lowermost limit (e.g., T-Set minus 3° C., the coil output power is set to a fourth power level greater than the third power level (e.g., T-Set multiplied by 8 Watts) (step 735). When T-Bottom is less than the lowermost limit, the mode changes to the low temperature mode (step 740).

Figure 12:
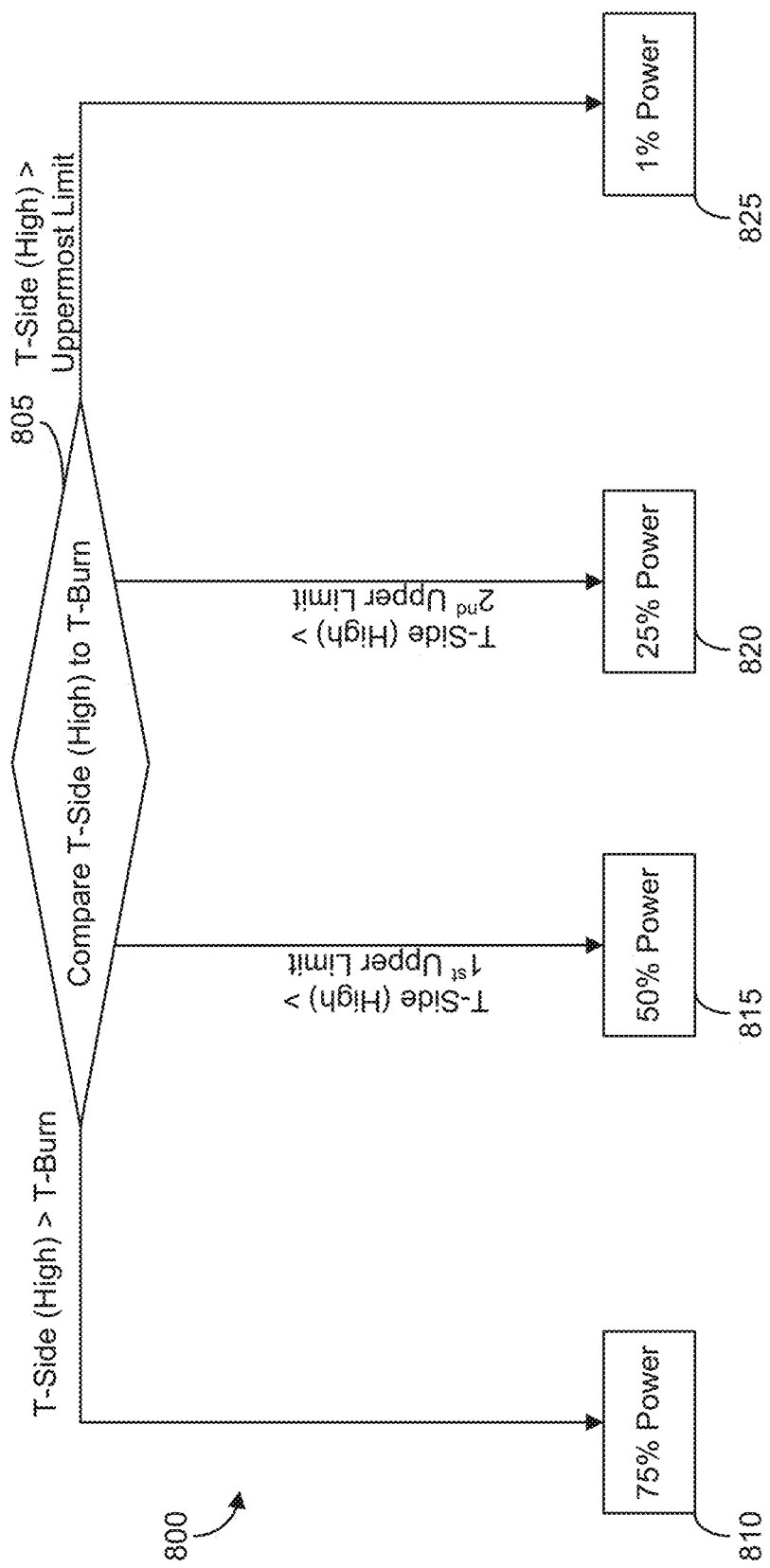
FIG. 12 is a flow chart of a process for a burning prevention mode of operation for a rethermalizing station, according to an exemplary embodiment.
Figure 13:
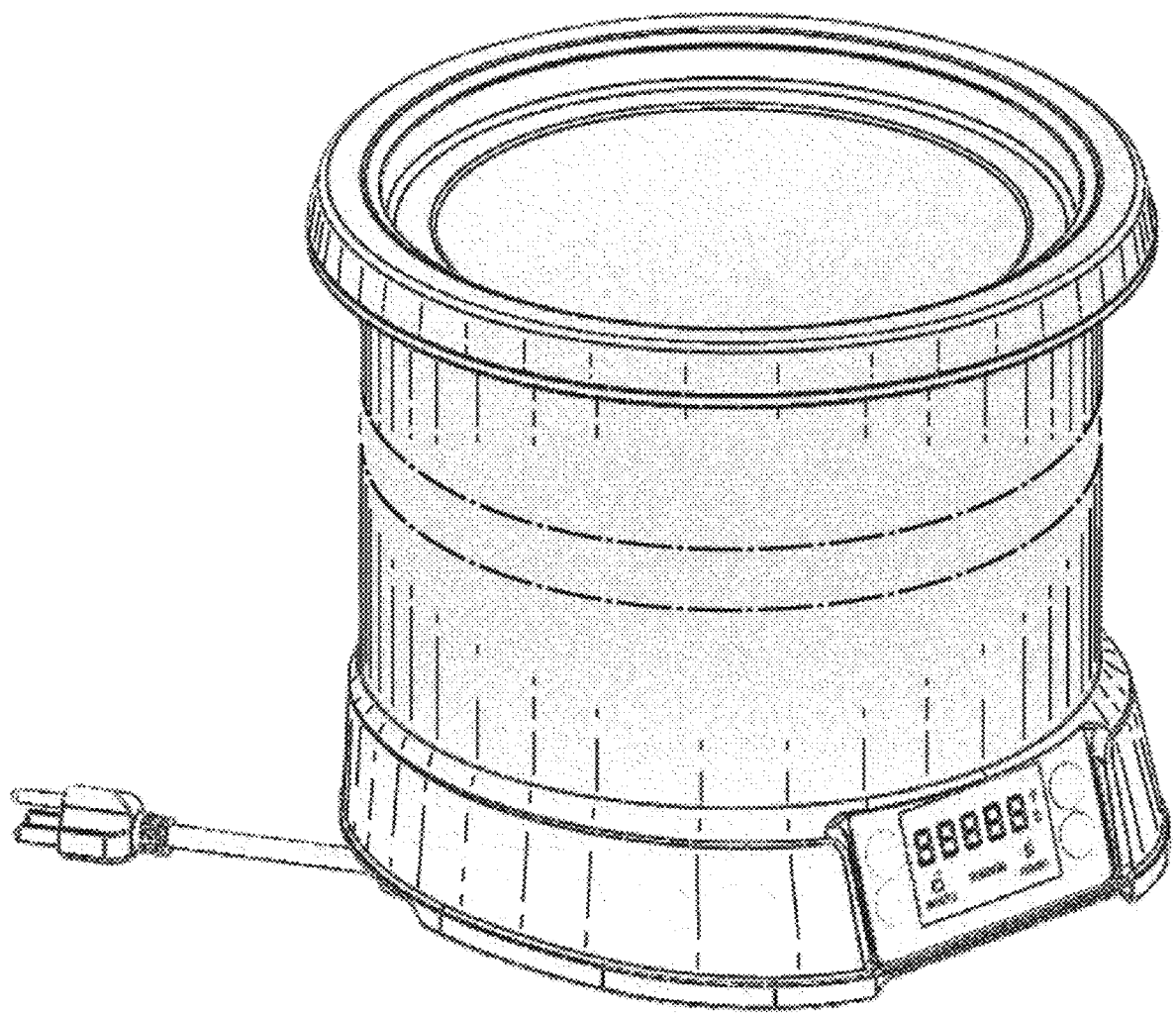
FIG. 13 is a perspective view of a base of a rethermalizing station according to an exemplary embodiment.
Figure 14:
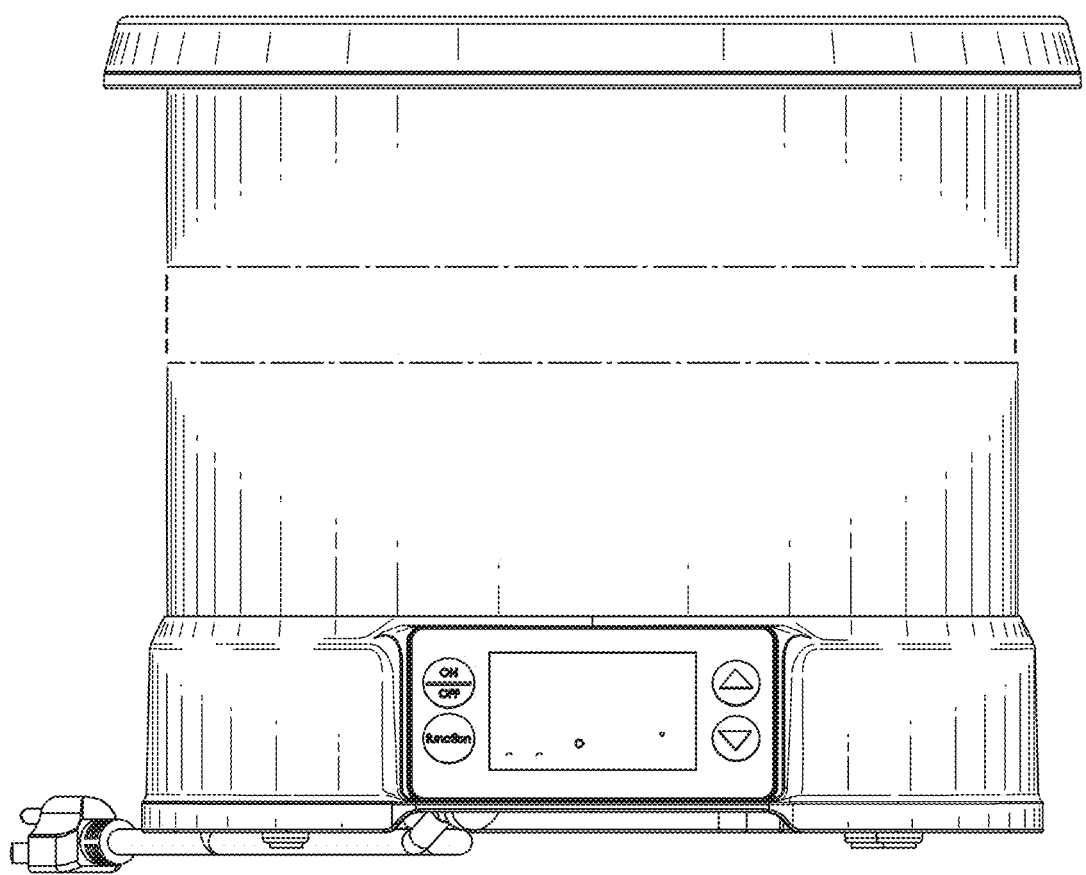
FIG. 14 is a front view of the base of FIG. 13.
Figure 15:
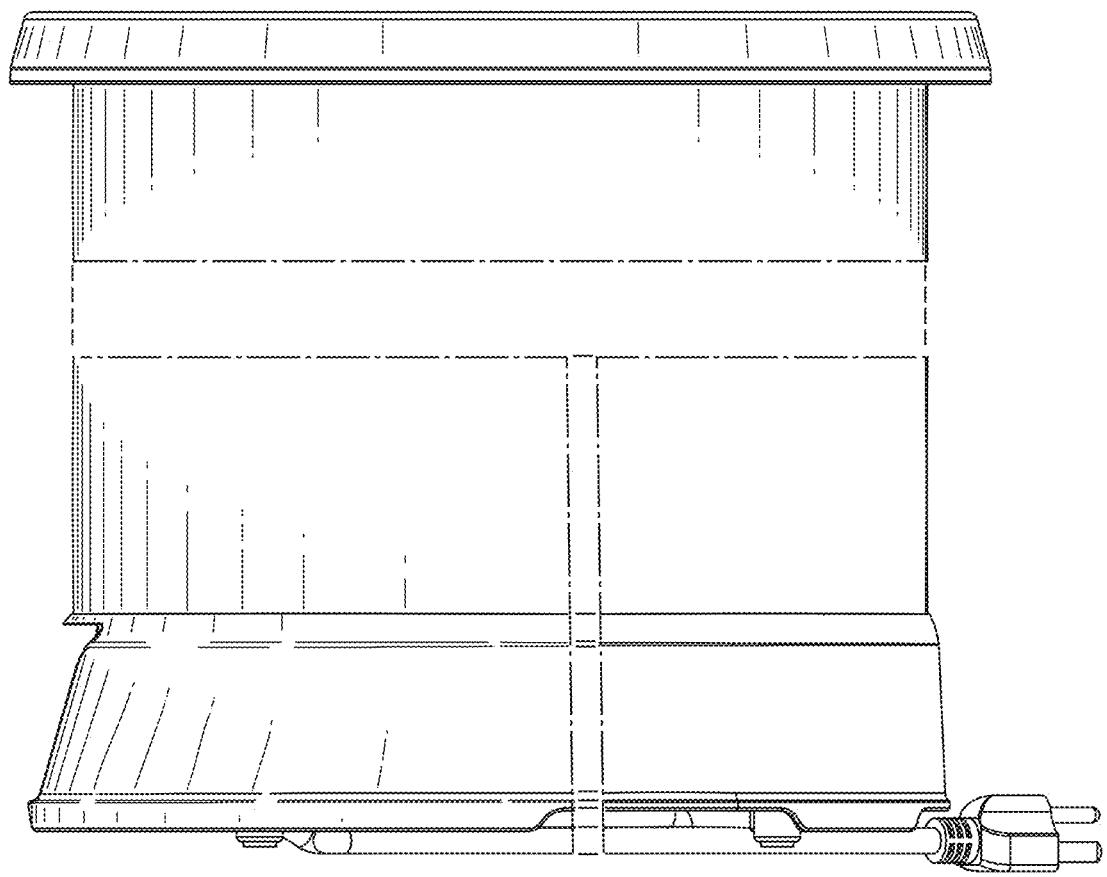
FIG. 15 is a side view of the base of FIG. 13.
Figure 16:
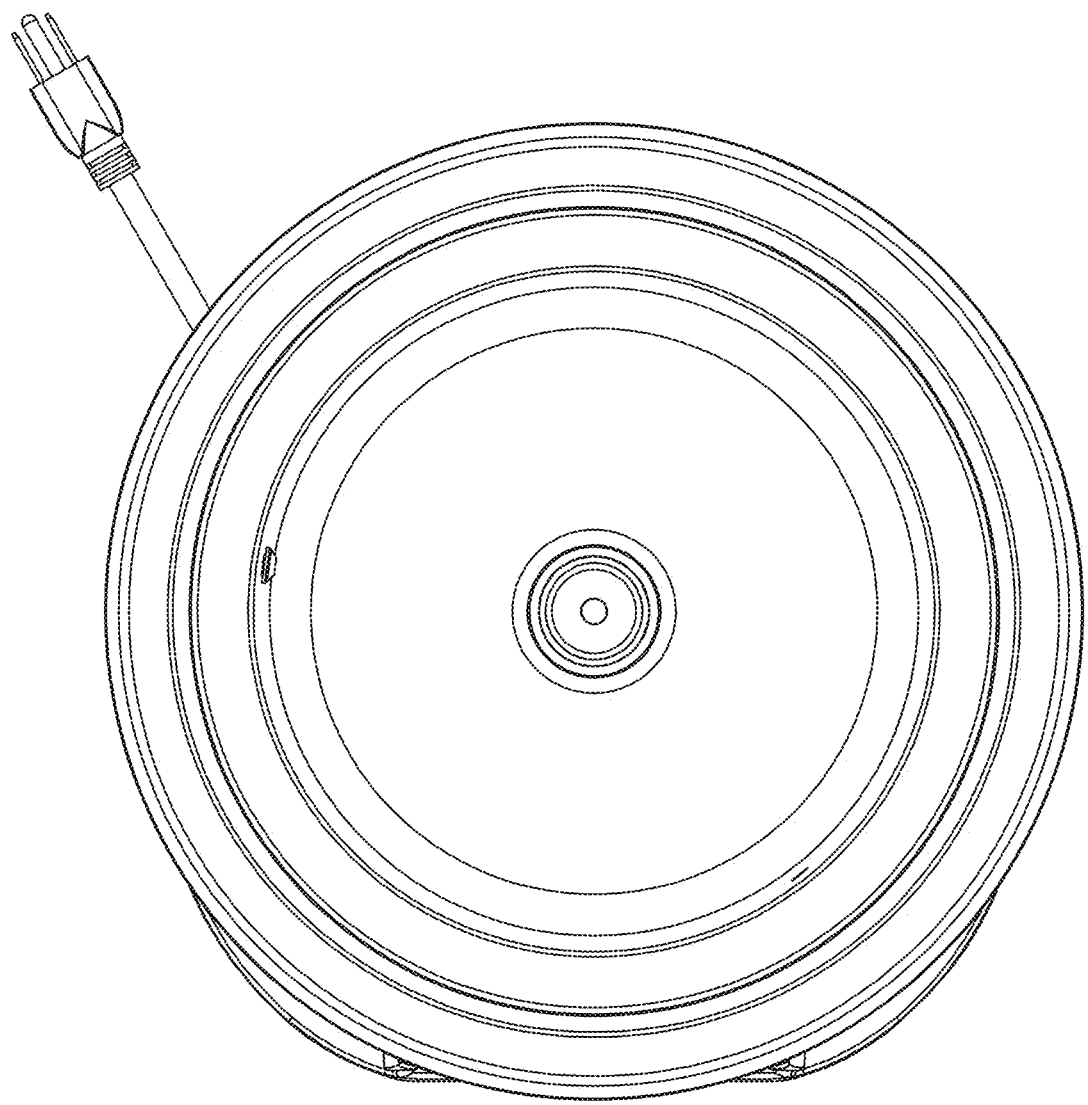
FIG. 16 is a top view of the base of FIG. 13.

Referring to FIG. 12, a flow chart of process 800 of the burning prevention mode is shown, according to an exemplary embodiment. Process 800 begins at step 805 with a comparison of the highest temperature detected by either of the side temperature sensors 175 and 180 ("T-Side (High)") with the burn warning temperature ("T-Burn") (e.g., 99° C.). When T-Side (High) is greater than the burn warning temperature, the coil output power cannot exceed 75% power (e.g., 600 Watts) (step 810). When T-Side (High) is greater than a first upper limit (e.g., T-Burn plus 2° C.), the coil output power cannot exceed a first reduced output power such as 50% power (e.g., 400 Watts) (step 815). When T-Side (High) is greater than a second upper limit (e.g., T-Burn plus 4° C.), the coil output power cannot exceed a second reduced output power such as 25% power (e.g., 200 Watts) (step 820). When T-Side (High) is greater than an uppermost limit (e.g., T-Burn plus 6° C.), the coil output power cannot exceed a minimum output power such as 1% power (e.g., 8 Watts) (step 825).

FIGS. 13-16 illustrate a base (e.g., base 105) of a rethermalizing station (e.g., rethermalizing station 100) according to an exemplary embodiment.

Figure 17:
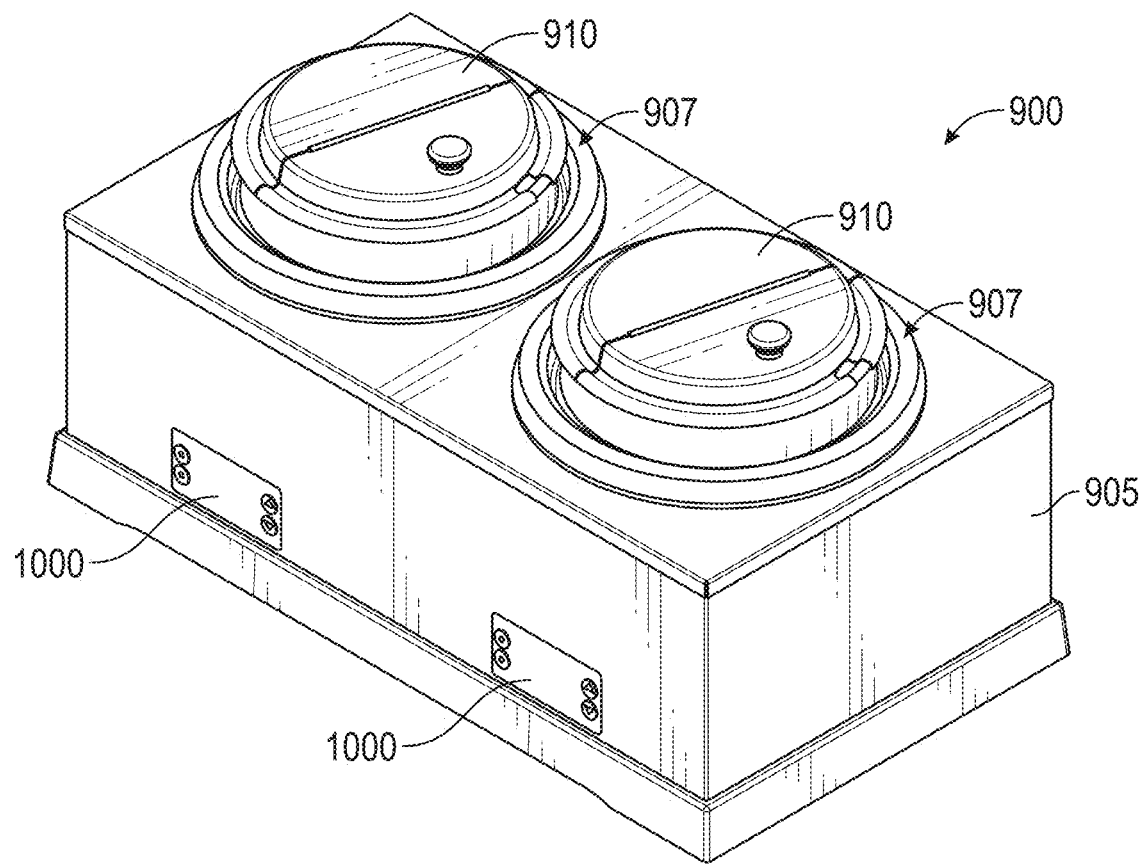
FIG. 17 is a perspective view of a rethermalizing station according to an exemplary embodiment.
Figure 18:
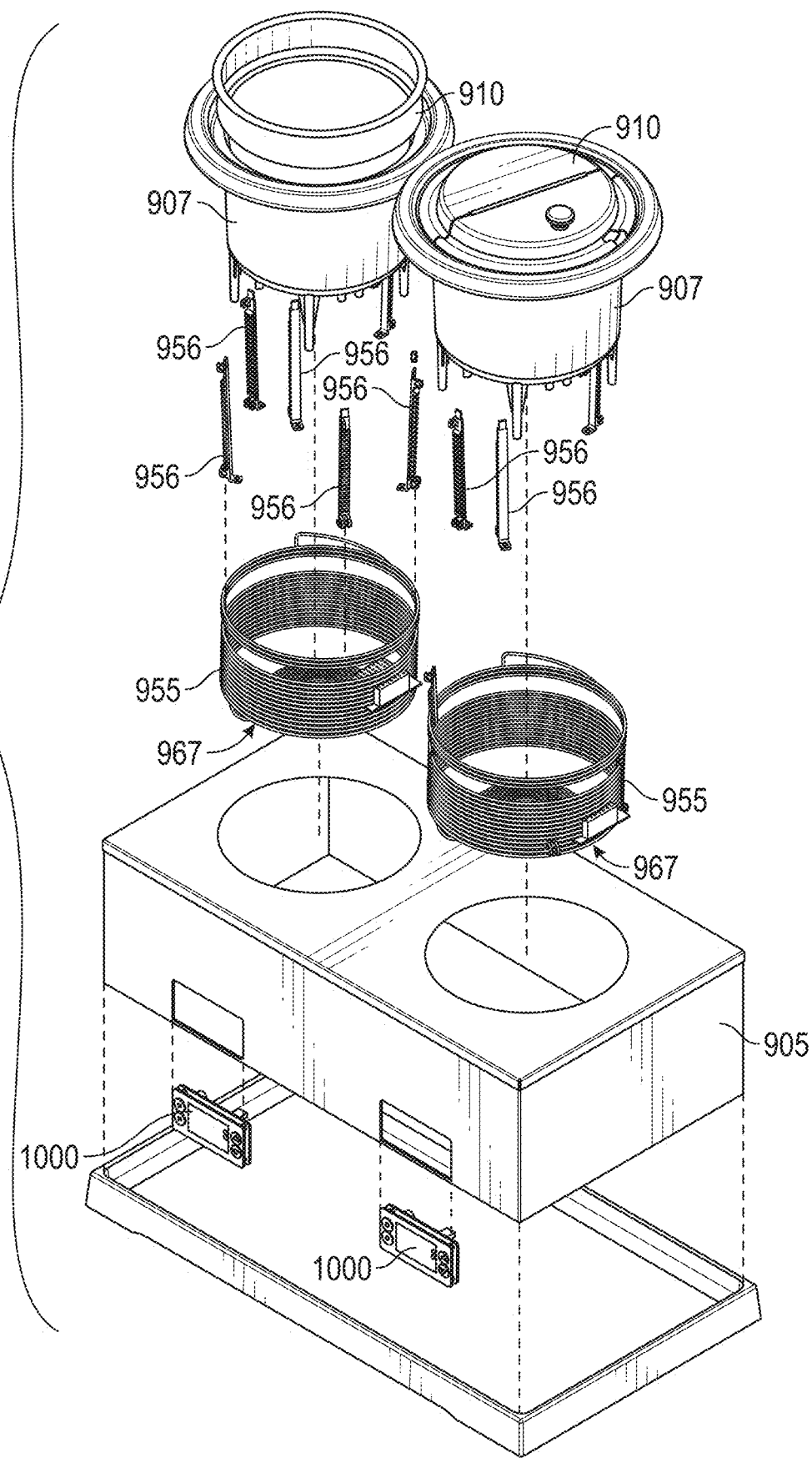
FIG. 18 is an exploded view of the rethermalizing station of FIG. 17.

FIGS. 17-18 illustrate a rethermalizing station 900 according to an exemplary embodiment. The rethermalizing station 900 is similar to the rethermalizing station 100, but includes two wells 907 and 907 in a single base or housing 905. In some embodiments, the rethermalizing station 900 includes more than two wells. Each well 907 is configured to hold a food pan 910. Each well 907 is surrounded by a side induction coil 955 and has a bottom induction coil 967 located proximate the bottom of the well. One or more induction coil holders 956 support and position the side induction coil 955. A separate user interface 1000 is provided for each well and each well is controlled by a separate control unit 190. In some embodiments, a single user interface and a single control unit 190 are provided to control both wells. A selector switch or other user input may be provided to switch between controlling each of the wells or both of the wells.

Figure 19:
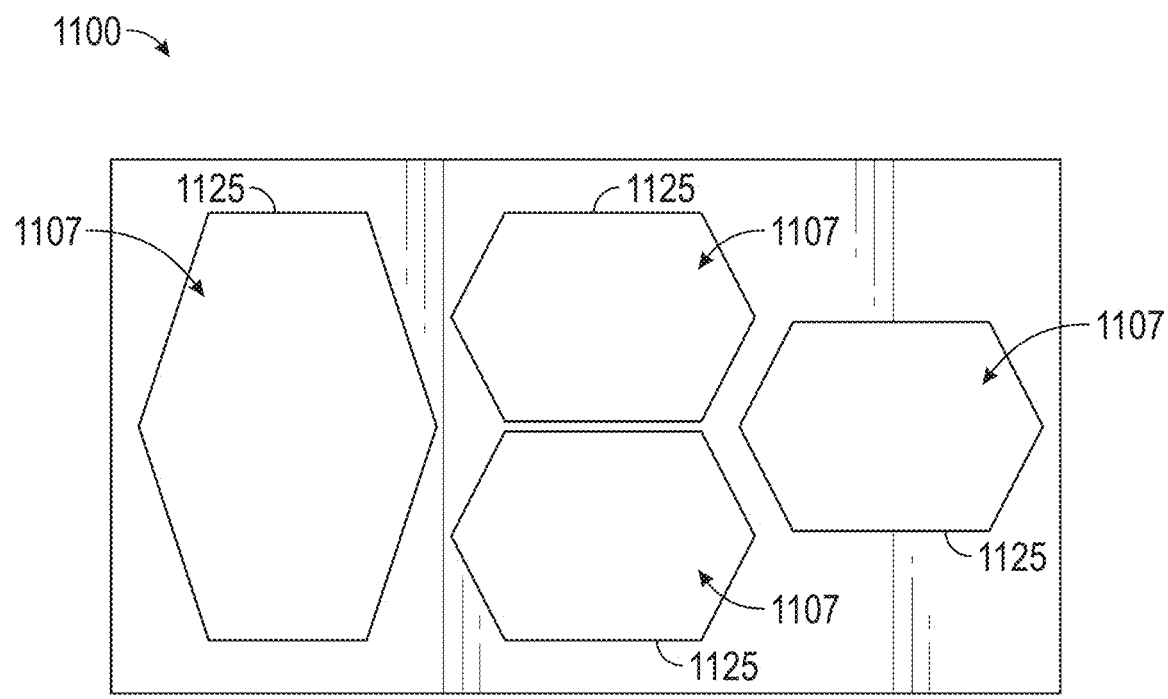
FIG. 19 is a top view of the rethermalizing station of FIG. 17 according to an alternative embodiment.
Figure 20:
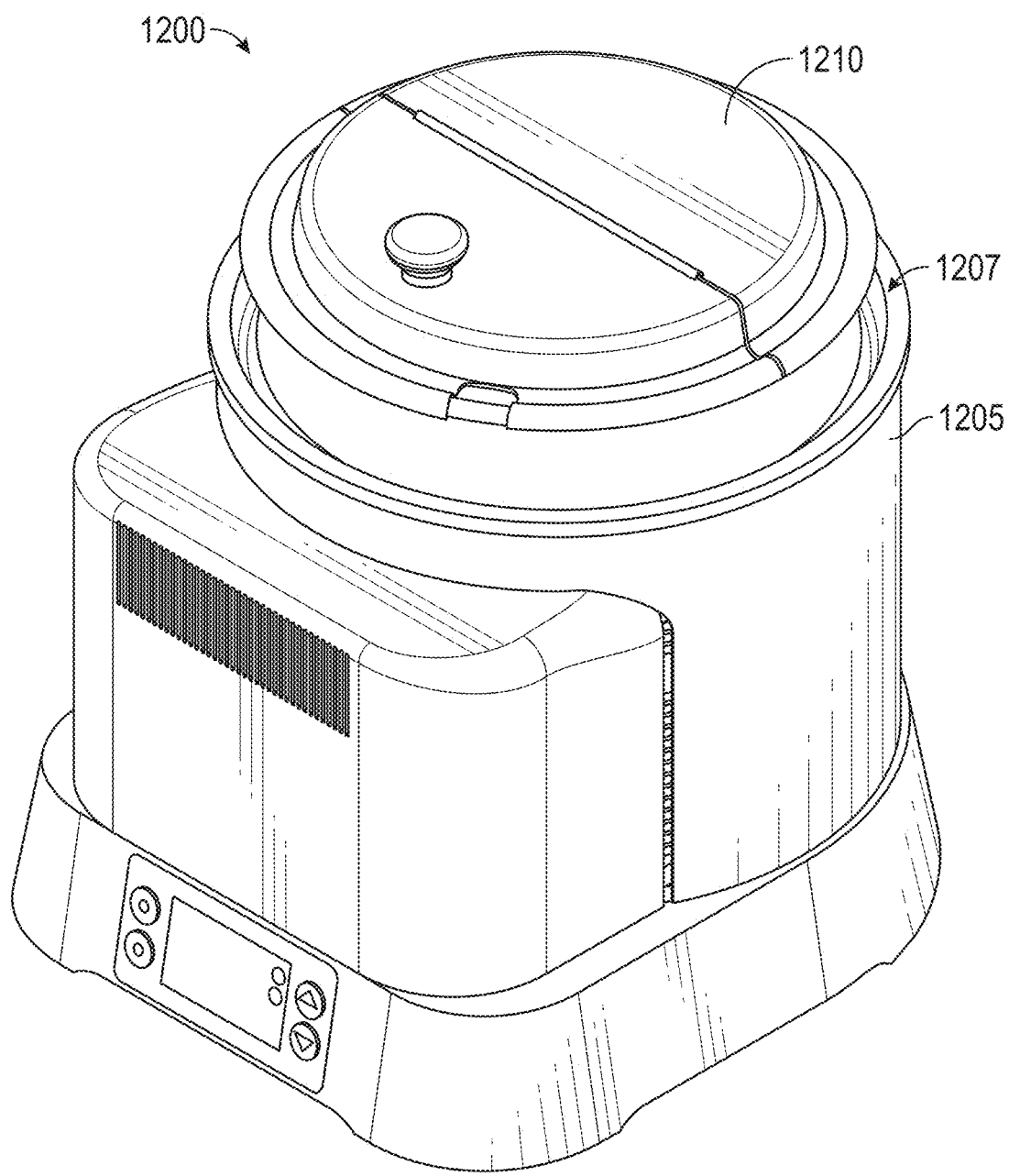
FIG. 20 is a perspective view of a rethermalizing station according to an exemplary embodiment.
Figure 21:
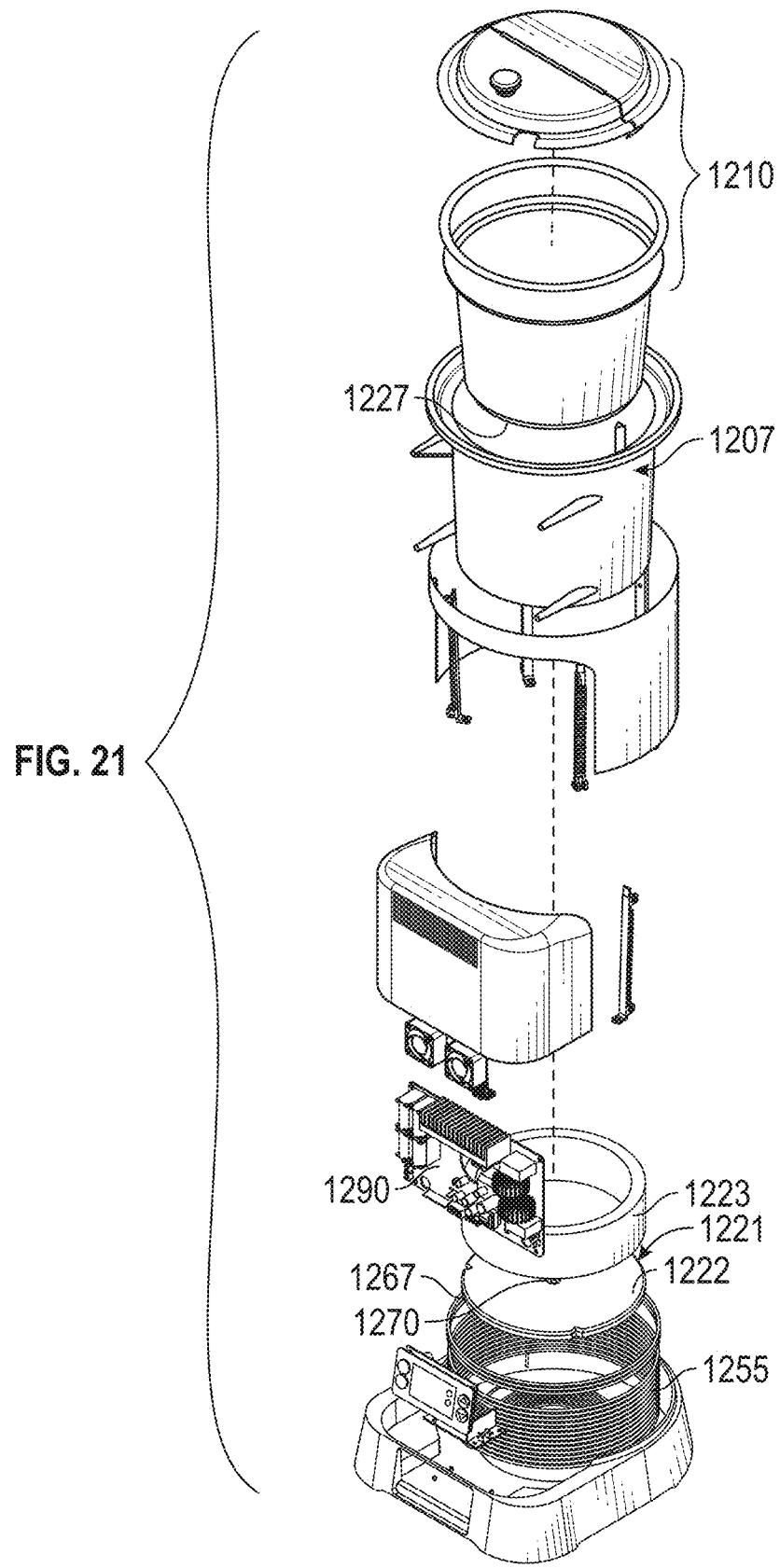
FIG. 21 is an exploded view of the rethermalizing station of FIG. 20.
Figure 22:
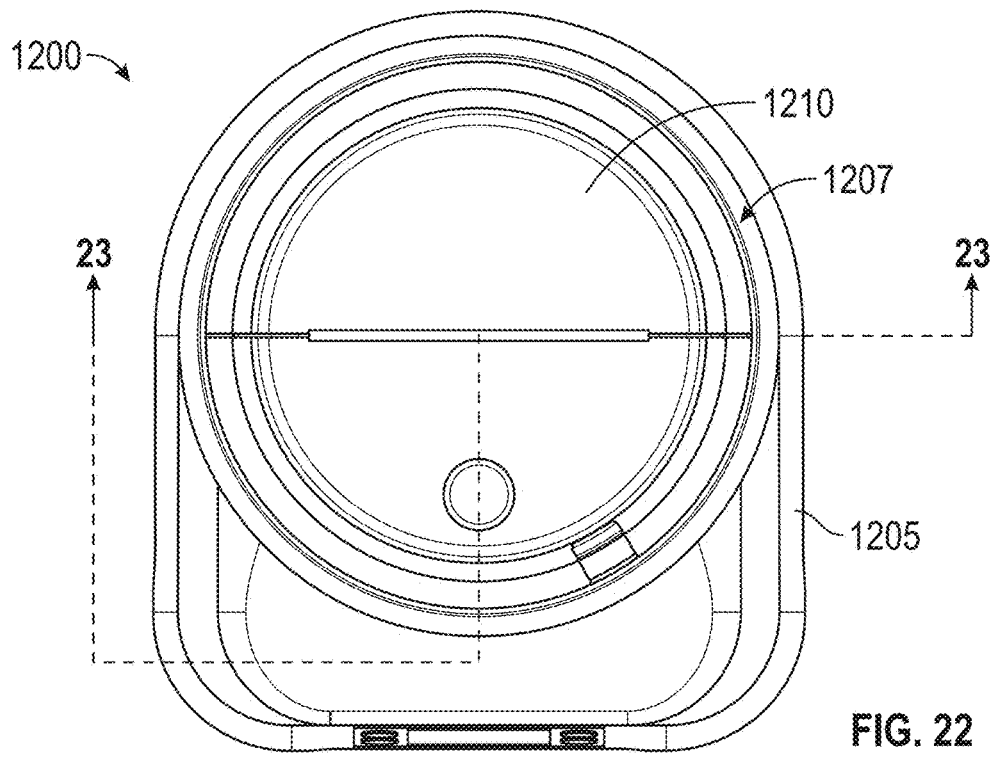
FIG. 22 is a top view of the rethermalizing station of FIG. 20.
Figure 23:
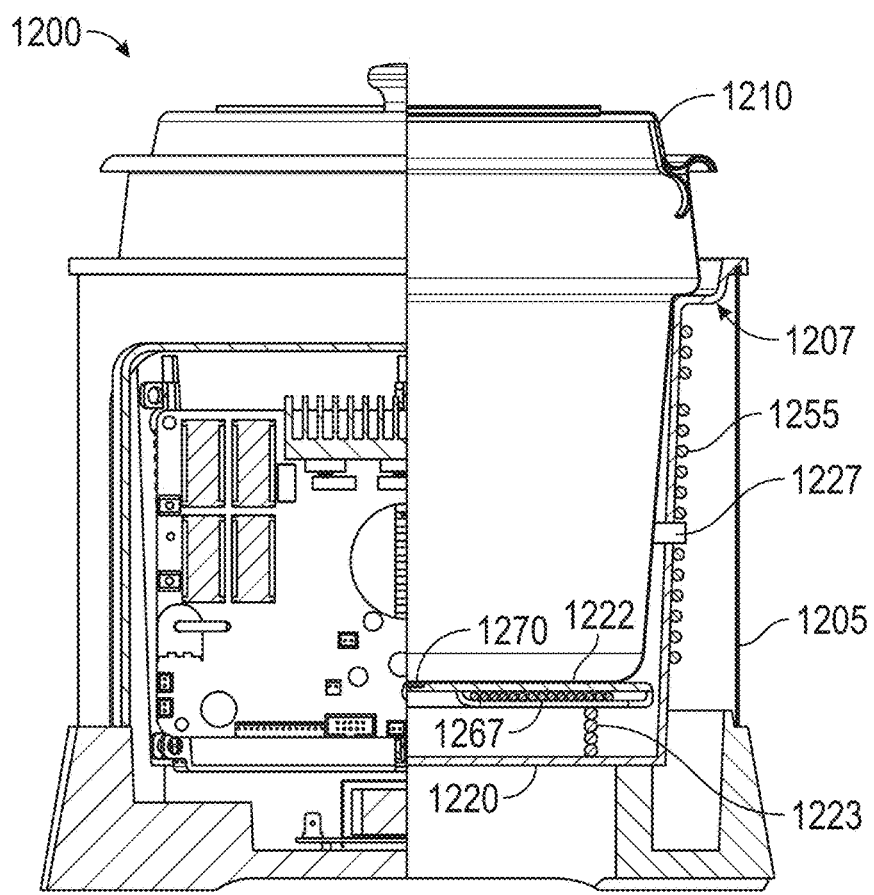
FIG. 23 is a section view of the rethermalizing station of FIG. 20 along line 23-23.
Figure 24:
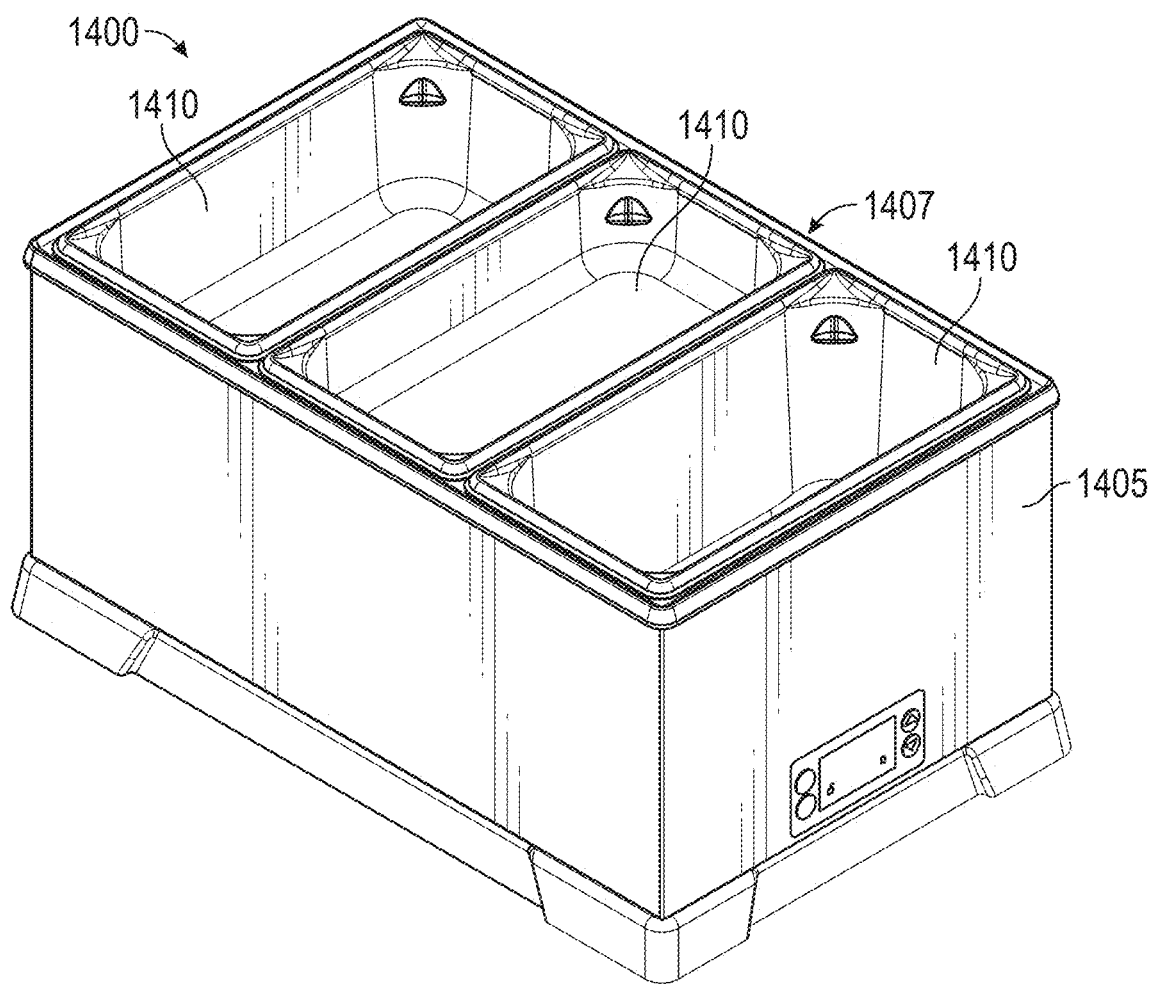
FIG. 24 is a perspective view of a rethermalizing station according to an exemplary embodiment.
Figure 25:
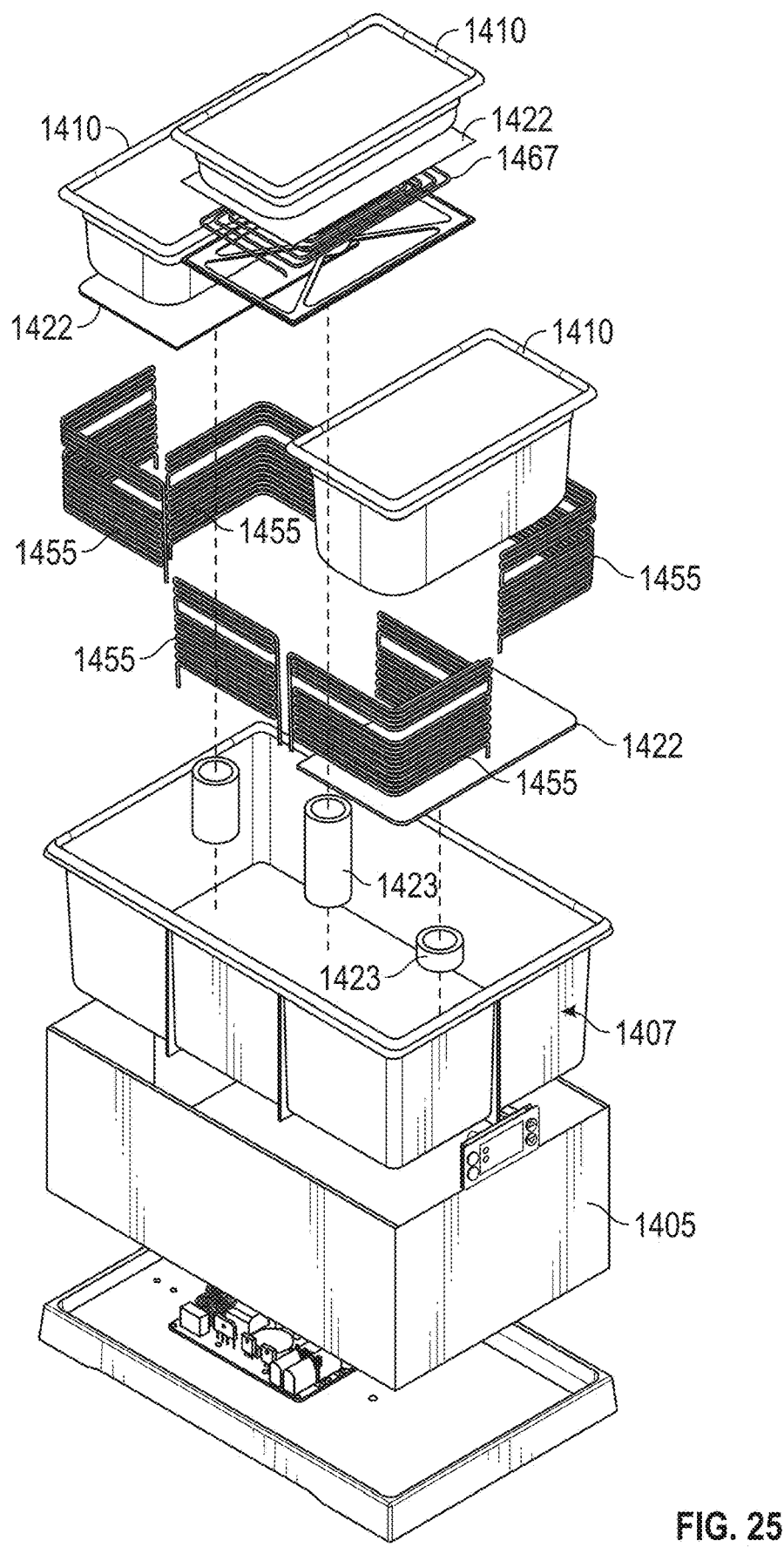
FIG. 25 is an exploded view of the rethermalizing station of FIG. 24.
Figure 26:
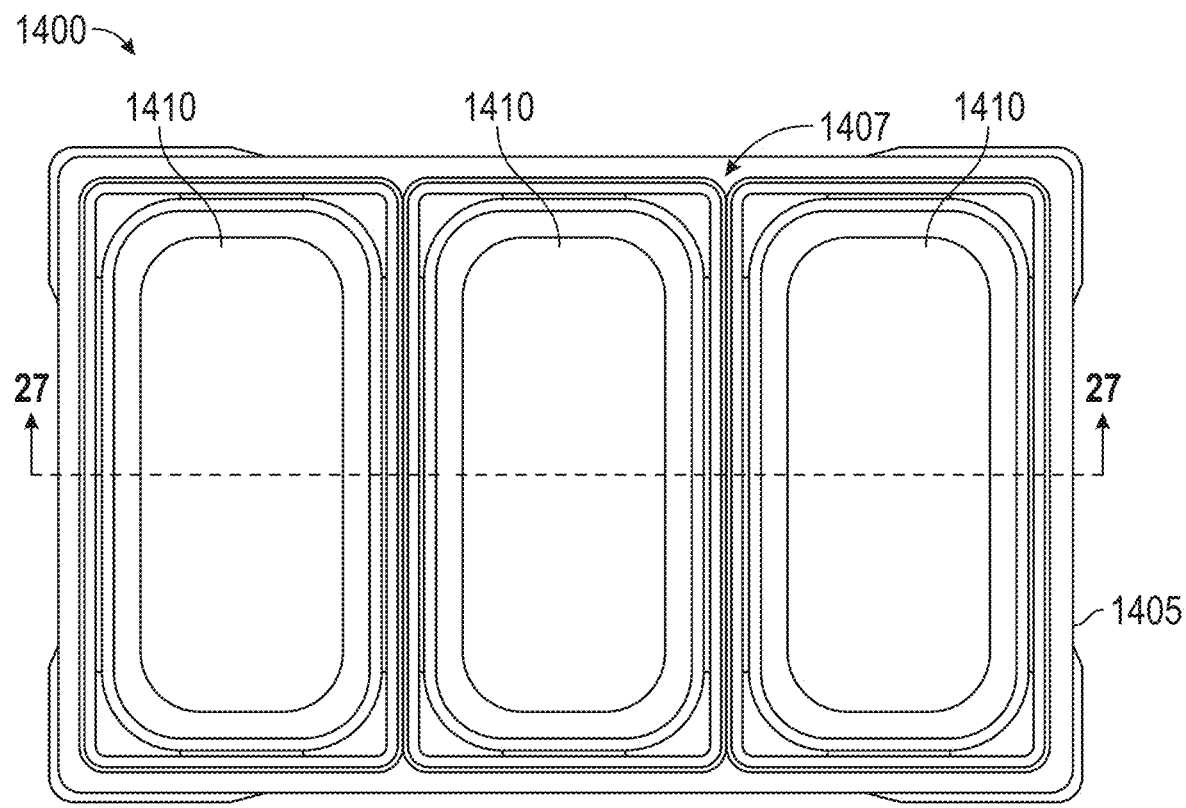
FIG. 26 is a top view of the rethermalizing station of FIG. 24.

FIG. 19 illustrates a rethermalizing station 1100 according to an exemplary embodiment. The rethermalizing station 1100 includes multiple wells 1107 with each well having a custom, user-specified perimeter 1125. Wells having a custom perimeter 1125 allow the user to design the rethermalizing station for specific applications, for a desired aesthetic appearance, to fit a specific area, or for other reasons. In the illustrated embodiment, the rethermalizing station 1100 includes four wells 1107 have six-sided perimeters 1125, with one well having substantially larger area than the other three.

FIGS. 20-23 illustrate a rethermalizing station 1200 according to an exemplary embodiment. The rethermalizing station 1200 is similar to the rethermalizing station 100, but includes a movable well bottom assembly 1221. The movable well bottom assembly 1221 allows the well 1207 to accommodate food pans 1210 of different depths. For example, the well 1207 can accommodate both a relatively short food pan (e.g., a four quart soup pot) and a relatively tall food pan (e.g., a seven quart soup pot). The movable bottom assembly 1221 allows the depth of the well 1207 to vary with the depth of the food pan 1210 while maintaining inductive coupling between the bottom induction coil 1267 and the food pan 1210. The well 1207 is supported by a base 1205.

The movable bottom assembly 1221 includes the bottom induction coil 1267 and is configured to contact the bottom 1227 of the food pan 1210. A bottom base or insert 1222 supports the bottom induction coil 1267 and the bottom temperature sensor 1270. A lift member 1223 moves the bottom insert 1222 relative to the bottom 1220 of the well 1207. In the illustrated embodiment, the lift member 1223 is a spring. The spring biases the bottom insert 1222 upward away from the bottom 1220. In this way, the depth of the movable bottom assembly 1221 varies automatically in response to the size of the food pan 1210 inserted in the well 1207 because the bottom assembly 1221 will move upward until it contacts the bottom 1227 of the food pan 1210. The stiffness of the spring is selected so that the bottom assembly 1221 will rise to contact a relatively short food pan, but is not so strong as to eject a relatively tall food pan from the well 1207 as the food pan is emptied of food items. In some embodiments, the lift member 1223 is a scissors-style lift, a multi-bar linkage, or other appropriate device. In some embodiments, the movement of the lift member 1223 may be biased (e.g., by a spring) or may be controlled (e.g., by a ball screw, lever, or other appropriate device) either manually or automatically (e.g., by a motor or actuator).

In some embodiments, the bottom induction coil 1267 and the side induction coil 1255 are separate components and are independently controlled. This allows the side induction coil 1255 to be turned off when a sufficiently short food pan is inserted in the well 1207. For sufficiently short food pans (e.g., a four quart soup pot), the bottom induction coil 1267 is able to provide sufficient heating on its own. A height sensor 1227 (e.g., a limit or proximity switch or sensor) detects when the bottom insert 1222 is at a specified height. At the specified height, the side induction coil 1255 is turned off. When the side induction coil 1255 is turned off, the control unit 1290 is configured to operate the bottom induction coil 1267 without inputs from the side temperature sensors. In some embodiments, the sidewalls of sufficiently short food pans are angled so that the side temperature sensors would not make contact with the food pans, and would therefore be unable to provide reliable temperature inputs even if utilized by the control unit 1290. In some embodiments, multiple side induction coils are provided. This allows each of the side induction coils to be independently controlled. For example, a first side induction coil is located below the height sensor 1227 and can be turned off when the height sensor 1227 detects the bottom insert 122 at the specified height while a second side induction coil located above the height sensor 1227 remains on.

Figure 27:
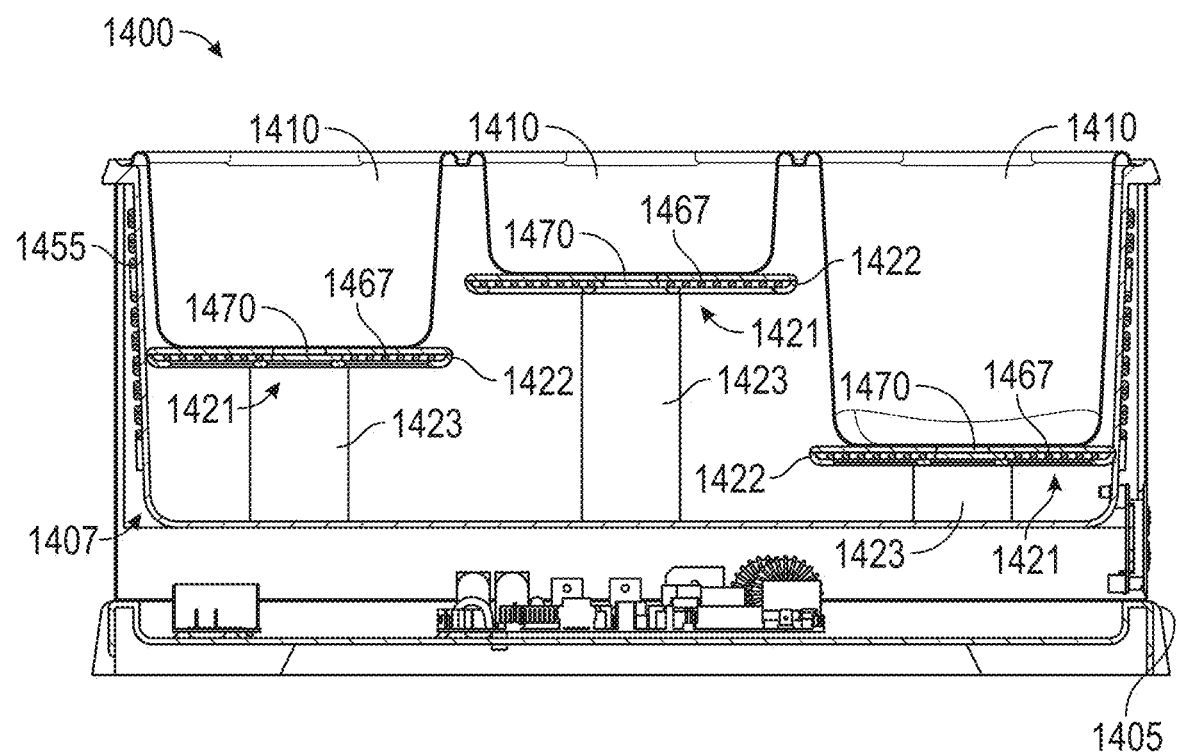
FIG. 27 is a section view of the rethermalizing station of FIG. 24 along line 27-27.

FIGS. 24-28 illustrate a rethermalizing station 1400 according to an exemplary embodiment. The rethermalizing station 1400 includes a well 1407 supported by a base 1405. Each well 1407 has three movable bottom assemblies 1421. This allows the well 1407 to accommodate a single food pan that spans the entire well (e.g., a single full size hotel pan), three foods pans of the same depth (e.g., three relatively tall third size hotel pans), three food pans of different depths (e.g., one relatively tall third size food pan, one relatively short third size food pan, and one intermediate depth third size food pan), or other appropriate combinations of food pans. In a preferred embodiment, the well 1407 is sized and shaped to receive a single full size hotel pan in depths of 6 inches, 4 inches, or 2.5 inches or three third size hotel pans in depths of 6 inches, 4 inches, or 2.5 inches (as shown in FIG. 27). Each movable bottom assembly 1421 is similar to bottom assembly 1221 and includes a bottom insert 1422, a bottom induction coil 1467, and a bottom temperature sensor 1470. A lift member 1423 similar to the lift member 1223 is configured to maintain contact between the bottom insert 1422 and a food pan 1410.

Figure 28:
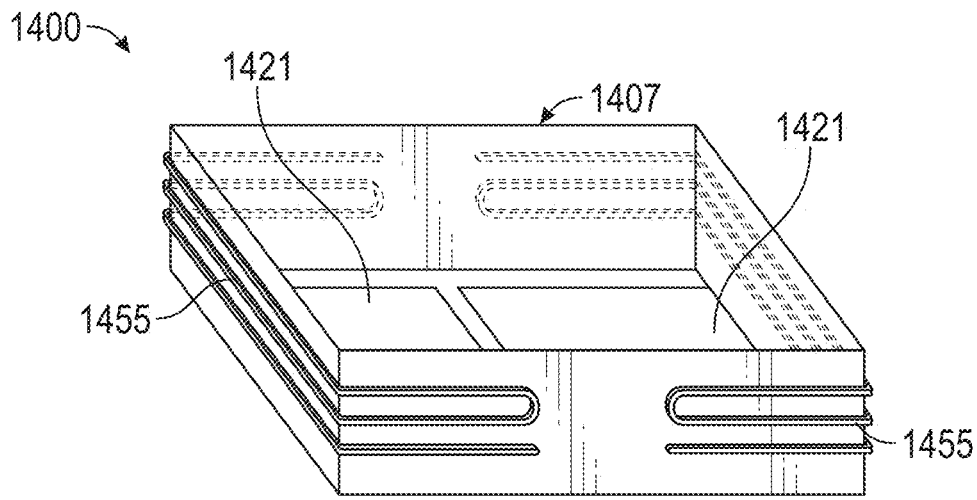
FIG. 28 is a perspective view of the well of the rethermalizing station of FIG. 24 according to an alternative embodiment.
Figure 29:
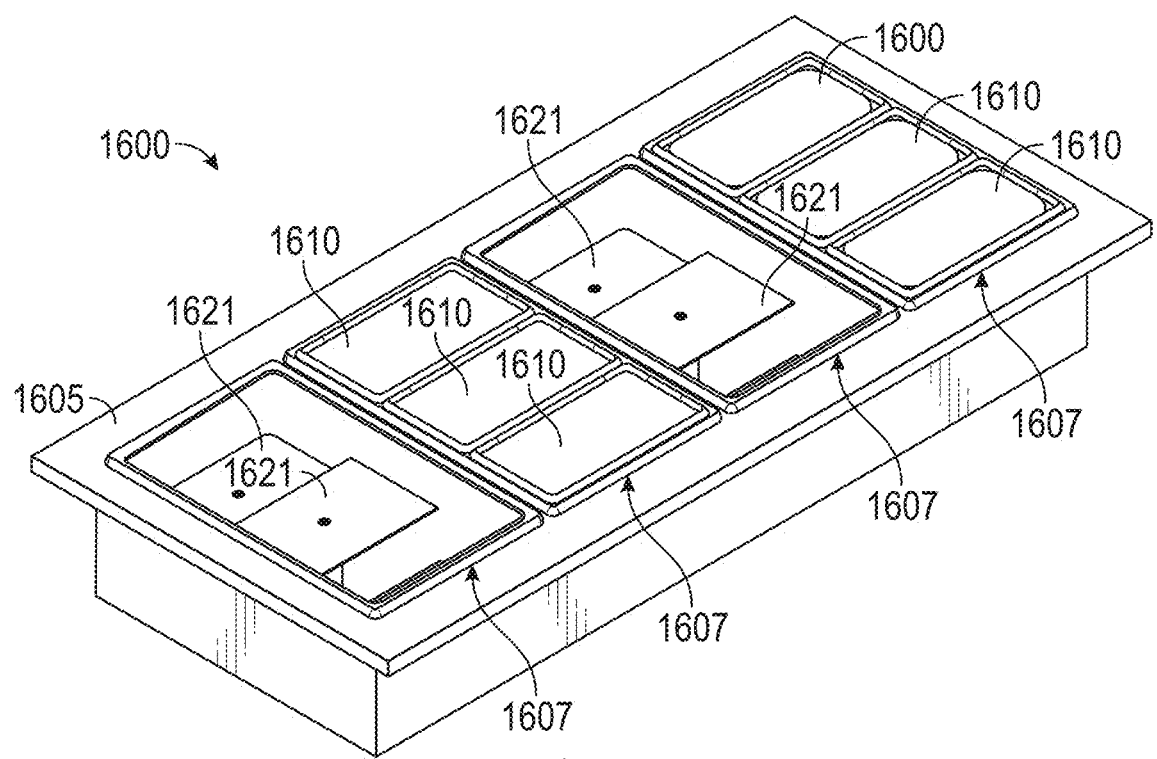
FIG. 29 is a perspective view of a rethermalizing station according to an exemplary embodiment.
Figure 30:
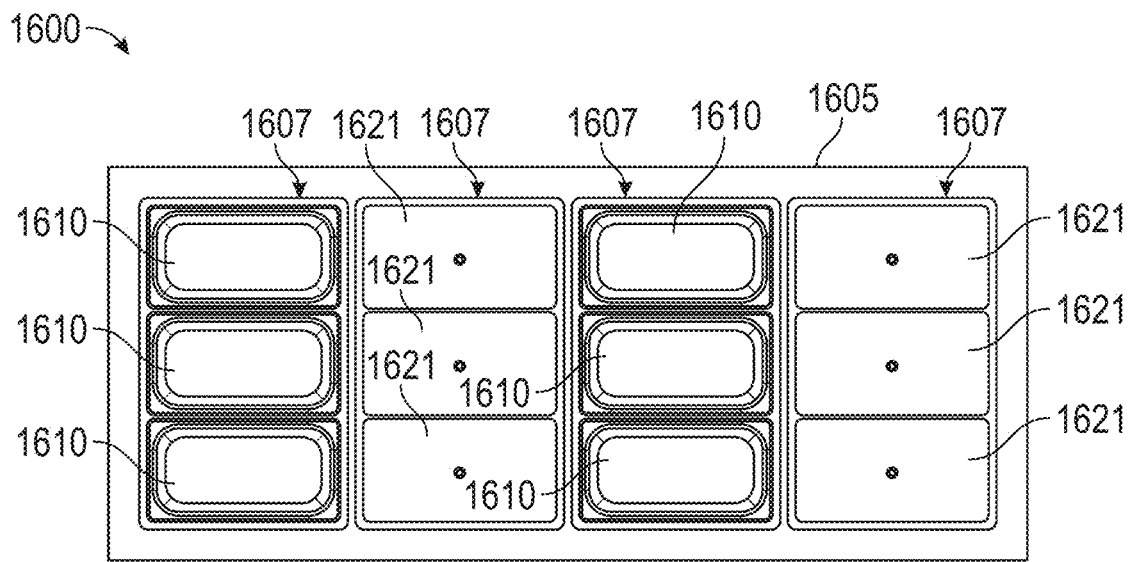
FIG. 30 is a top view of the rethermalizing station of FIG. 29.
Figure 31:
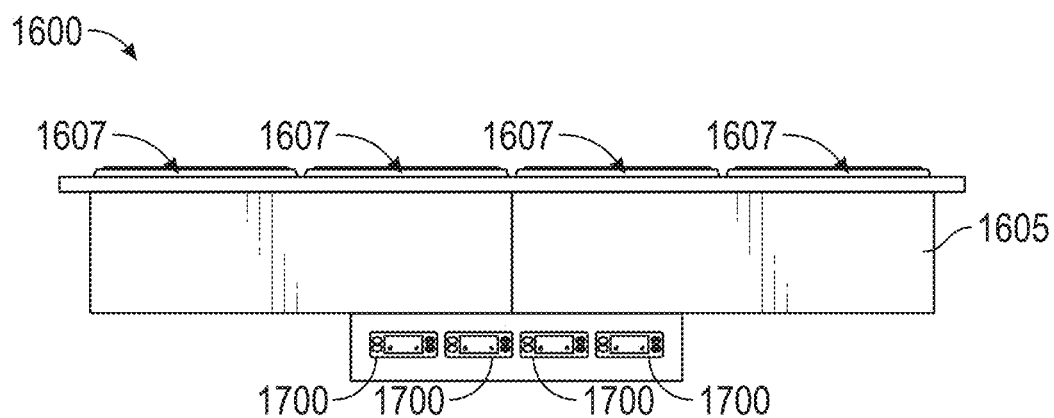
FIG. 31 is a front view of the rethermalizing station of FIG. 29.
Figure 32:
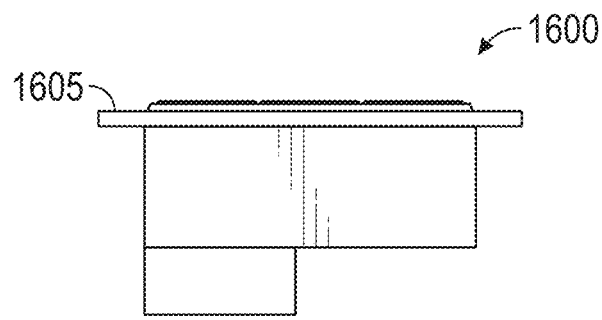
FIG. 32 is a side view of the rethermalizing station of FIG. 29.
Figure 33:
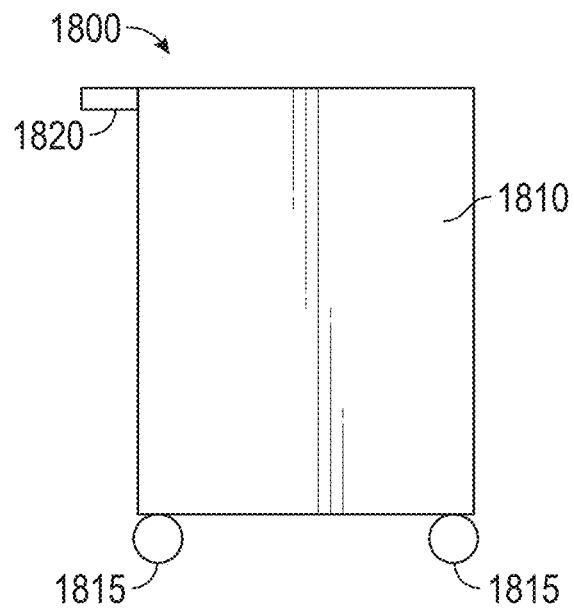
FIG. 33 is a side view of a holding container according to an exemplary embodiment.

In some embodiments, as shown in FIG. 28, the well 1407 includes two movable bottom assemblies 1421. In other embodiments, the well 1407 includes more than three movable bottom assemblies 1421. In some embodiments, one or more side temperature sensors similar to side temperature sensors 175 and 180 are provided for each of the wells 1407 to detect a side temperature of a food pan inserted in the corresponding well 1407.

In some embodiments, as shown in FIGS. 24-27, a single side induction coil 1455 surrounds the well 1407. In other embodiments, as shown in FIG. 28, multiple side induction coils 1455 are used to provide separate or individual control over different portions of the well 1407. When multiple movable bottom assemblies 1421 are used, they may be independently operated or controlled (e.g., for multiple food pans 1410) or operated and controlled together (e.g., for a single food pan 1410 within the well 1407). In FIG. 28, the rethermalizing station 1400 includes two movable bottom assemblies 1421 and two side induction coils 1455—one extending along the three exterior sides of the first movable bottom assembly 1421 and the second extending along the three exterior sides of the second movable bottom assembly 1421. In other embodiments, the side induction coil is omitted.

FIGS. 29-32 illustrate a rethermalizing station 1600 according to an exemplary embodiment. The rethermalizing station 1600 includes four wells 1607 supported by a base 1605, each similar to the well 1407. Each of the wells 1607 includes three movable bottom assemblies 1621. Third size food pans 1610 are illustrated as inserted in two of the wells 1607. Similarly to the multiple well rethermalizing station 900, a separate user interface 1700 is provided for each well and each well is controlled by a separate control unit. In some embodiments, a single user interface and a single control unit are provided to control all of the wells or a subset of the wells (e.g. two of the wells). A selector switch or other user input may be provided to switch between controlling each of the wells or all of the wells.

FIGS. 33-36 illustrate a heated holding container, cabinet, or hot box 1800 according to an exemplary embodiment.

The holding container 1800 includes a body 1805 and a movable door 1810. Wheels 1815 and a handle 1820 are provided for moving the holding container 1800 from place-to-place. In some embodiments, the wheels and handle or the handle alone are omitted.

Figure 34:
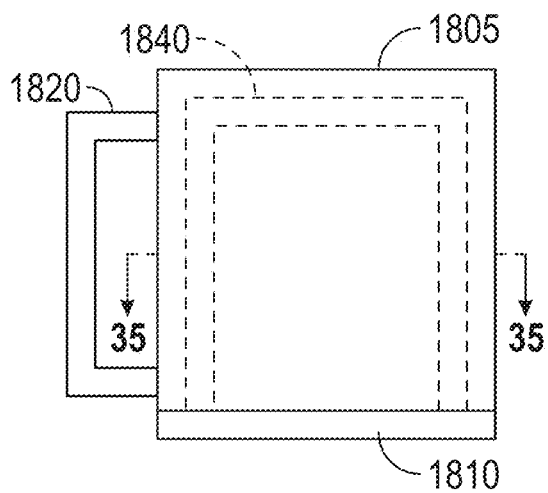
FIG. 34 is a top view of the holding container of FIG. 33.
Figure 36:
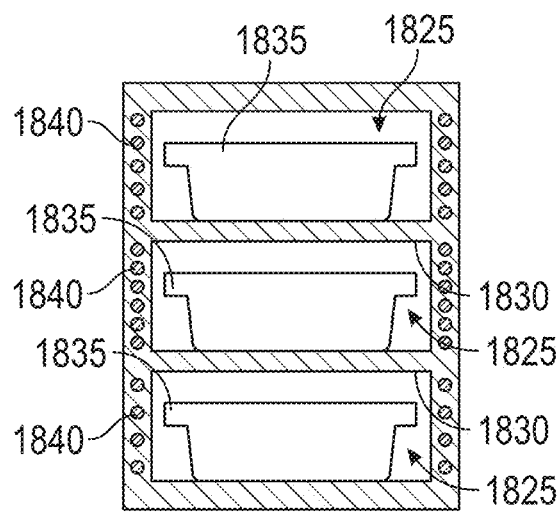
FIG. 36 is a section view of the holding container of FIG. 33 along line 35-35 according to an alternative embodiment.

The door 1810 moves (e.g., pivots, slides, etc.) relative to the body 1805 to provide access to the interior volume of the body, which is divided into two or more compartments 1825 by two or more shelves 1830. Each shelf 1830 is configured to support a food pan 1835. The food pans 1835 are inductively heated by a three-dimensional side induction coil 1840 located in the body 1805. In some embodiments, as shown in FIG. 34, the side induction coil 1840 wraps around three sides (e.g., right, rear, and left) of each compartment 1825 and extends vertically along all of the compartments 1825. The side induction coil 1840 extends vertically along the height of the interior volume of the body 1805 (e.g., along substantially the entire height of the interior volume). In some embodiments, as shown in FIG. 36, multiple side induction coils 1840 are provided; one for each compartment 1825. The multiple side induction coils 1840 may be individually controlled so that compartments 1825 not in use may be turned off when appropriate. In some embodiments, the side induction coil extends into the door 1810 so that the induction coil wraps around four sides (e.g., right, rear, left, and front) of the compartments 1825.

Figure 35:
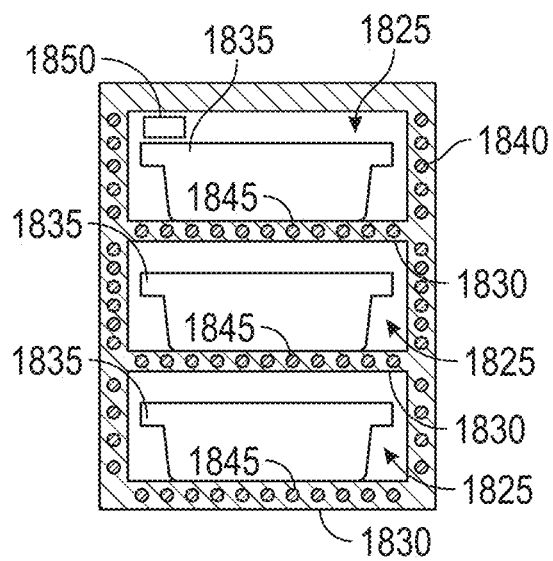
FIG. 35 is a section view of the holding container of FIG. 33 along line 35-35.

In some embodiments, as shown in FIG. 35, each shelf 1830 includes a bottom induction coil 1845 to inductively heat the food pan 1835 positioned on the shelf 1830. In some embodiments, the bottom induction coils 1845 may be individually controlled so that compartments 1825 not in use may be turned off when appropriate. In some embodiments, as shown in FIG. 36, the bottom induction coils 1845 are omitted and each shelf 1820 is made of a conductive material so that the shelf 1820 is inductively heated by the associated side induction coil 1845. The shelves 1820 are removable and can be mounted at different locations within the interior of the body 1805, which allows the number and size of the compartments 1825 to be modified as needed. In some embodiments, the side induction coil 1840 is omitted and heating is provided by the bottom induction coil 1845 in each shelf 1820 (e.g., in a manner similar to the warming shelves described herein). One or more temperature sensors 1850 may be provided. For example, a temperature sensor 1850 may be provided for each compartment to detect the temperature in the compartment or detect the temperature of the food pan positioned in the compartment. In embodiments with a single side induction coil 1840, the side induction coil 1840 and any bottom induction coils 1845 may be controlled to maintain a warming temperature set point (e.g., according to one of the control configurations described herein). In embodiments with multiple side induction coils 1840, the side induction coil 1840 and any bottom induction coils 1845 may be controlled independently to maintain a warming temperature set point for each of the compartments 1825 (e.g., according to one of the control configurations described herein). In some embodiments, the holding container 1800 includes a portable power supply (e.g., a battery) so that the induction coils may remain in operation during transit.

Figure 37:
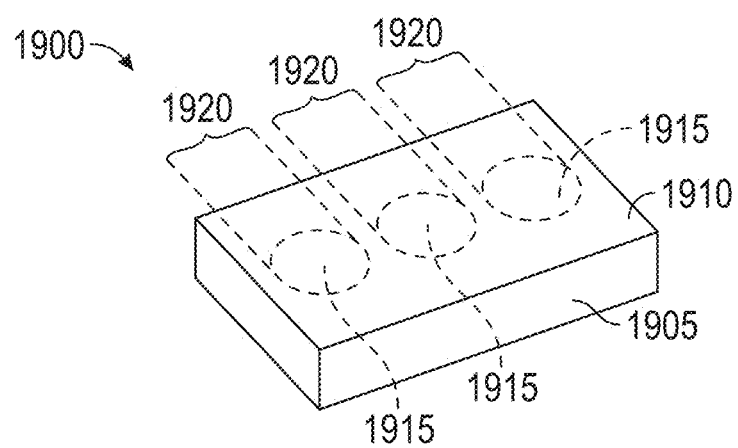
FIG. 37 is a perspective view of a warming shelf according to an exemplary embodiment.
Figure 38:
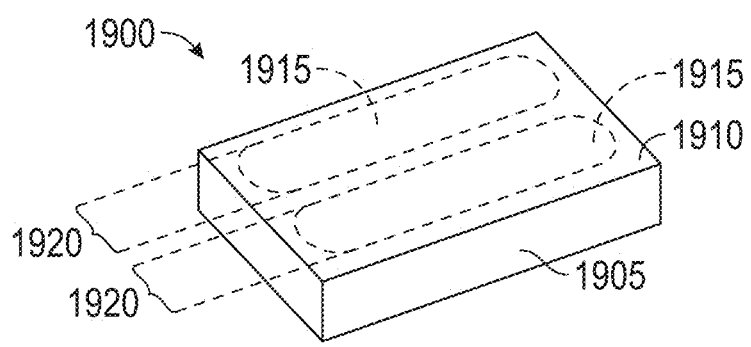
FIG. 38 is a perspective view of a warming shelf according to an exemplary embodiment.
Figure 39:
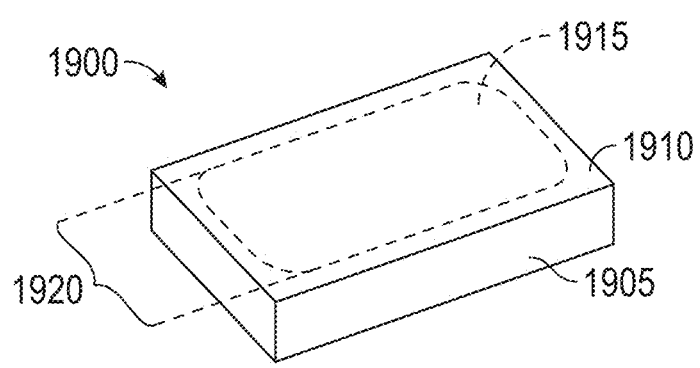
FIG. 39 is a perspective view of a warming shelf according to an exemplary embodiment.

FIGS. 37-39 illustrate a warming or heated shelf 1900 according to exemplary embodiments. The warming shelf 1900 includes a body 1905 having a top surface 1910. The body supports one or more induction coils 1915 to provide an equal number of heating zones 1920 on the top surface 1910. The number and shape of the induction coils 1915 and the associated heating zones 1920 may vary. A food pan or food pans placed on the top surface in one of the heating zones 1920 is inductively heated by the associated induction coil 1915 to a target warming temperature. One or more temperature sensors may be provided to determine a temperature of a food pan placed on the top surface 1910. For example, one temperature sensor may be provided for each heating zone 1920. The temperature sensors may be similar to the temperate sensor 170. Each of the induction coils 1915 is individually controlled. A separate user interface may be provided for each induction coil 1915, with each induction coil 1915 controlled by a separate control unit. In some embodiments, a single user interface and a single control unit are provided to control all of the induction coils 1915 or a subset of the induction coils 1915 (e.g., control each induction coils 1915 individually, control two of the induction coils 1915 as a pair, etc.). A selector switch or other user input may be provided to switch between controlling each of the coils or all of the coils. Each of the induction coils 1915 may be controlled to maintain the target warming temperature according to one of the control configurations described herein with respect to the rethermalizing stations In some embodiments, the rethermalizing stations described herein in are configured as cooking stations able to inductively heat food pans to temperatures sufficient to cook the food items contained in a food pan. In some of these embodiments, the cooking stations are configured as cook and hold stations in which the food items are cooked to a target cooking temperature and then held at a warming temperature after the food item is cooked at the target cooking temperature for a predetermined amount of time. The warming temperature may be the same temperature as the target cooking temperature or lower than the target cooking temperature. The cooking station may be controlled to maintain the target cooking temperature and the target cooking temperature according to one of the control configurations described herein with respect to the rethermalizing stations.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of operation of a rethermalizing station comprising a well, a plurality of food pans configured to be positioned in the well, an induction coil extending around a perimeter of the well, and a plurality of moveable bottom induction coils configured to be repositioned in the well for alignment with the plurality of food pans, the method comprising:
   detecting a first temperature of a food pan of the plurality of food pans;
   sensing a current through the induction coil;
   calculating an index number based on the current;
   determining whether the index number exceeds a threshold index number, wherein the threshold index number distinguishes first pans acceptable for use with the induction coil from second pans unacceptable for use with the induction coil;
   responsive to a determination that the index number does exceed the threshold index number, turning off the induction coil;
   responsive to a determination that the index number does not exceed the threshold index number, controlling the induction coil without using an on/off duty cycle by:
      comparing the first temperature of the food pan to an upper temperature limit defined as a function of a targeted temperature; and
      if the first temperature of the food pan is greater than the upper temperature limit, controlling a power output of the induction coil to a non-zero value configured to allow the first temperature to decrease toward the targeted temperature.

2. The method of claim 1, further comprising:
   detecting a second temperature of the food pan at a different elevation of the food pan than the first temperature;
   determining a temperature difference between the first temperature of the food pan and the second temperature of the food pan; and
   turning on an indicator when the temperature difference exceeds a targeted temperature difference, thereby indicating a need for user attention to the food pan.

3. The method of claim 2, wherein detecting the second temperature comprises measuring the second temperature with a temperature sensor coupled to a side wall of a well and positioned to contact the food pan to detect the second temperature of the food pan when the well receives the food pan.

4. The method of claim 1, comprising receiving the targeted temperature from a user via a user interface of the rethermalizing station.

5. The method of claim 1, comprising surrounding, by the induction coil, the food pan.

6. The method of claim 1, further comprising:
   if the first temperature of the food pan is less than the upper temperature limit, controlling a second induction coil to provide inductive heating of the food pan based on the first temperature of the food pan such that the first temperature of the food pan is maintained at the targeted temperature.

7. The method of claim 1, further comprising activating an audible indicator when the index number exceeds the threshold index number.

8. The method of claim 1, further comprising turning off the induction coil when a resonant frequency of the induction coil is above a threshold value.

9. The method of claim 1, further comprising:
   in response to the determination that the index number does not exceed the threshold index number:
      comparing the first temperature of the food pan to a lower temperature limit; and
      if the first temperature of the food pan is less than the lower temperature limit, controlling the power output of the induction coil to a maximum power output.

10. A rethermalizing station comprising:
   a well;
   a plurality of food pans configured to be positioned in the well;
   an induction coil, wherein the induction coil is a side induction coil extending around a perimeter of the well;
   a plurality of moveable bottom induction coils configured to be repositioned in the well for alignment with the plurality of food pans; and
   processing circuitry configured to perform operations comprising controlling the induction coil without using an on/off duty cycle by:
      responsive to a determination that a food pan acceptable for use with the induction coil is positioned at the rethermalizing station, comparing a measured temperature of the food pan to an upper temperature limit defined as a function of a selected temperature; and
      if the measured temperature of the food pan is greater than the upper temperature limit, controlling a power output of the induction coil to a non-zero value configured to allow the measured temperature to decrease toward the selected temperature.

11. The rethermalizing station of claim 10, wherein the operations further comprising determining whether the food pan positioned at the rethermalizing station is acceptable for use with the induction coil by:
  calculating an index number based on a sensed current through the induction coil;
  determining whether the index number exceeds a threshold index number, wherein the threshold index number is selected to distinguish between a good pan that is acceptable for use with the induction coil and a bad pan that is unacceptable for use with the induction coil.

12. The rethermalizing station of claim 10, the operations further comprising:
  obtaining a second temperature of the food pan measured at a different elevation than the measured temperature;
  determining a difference between the second temperature and the measured temperature;
  turning on an indicator when the difference exceeds a predefined difference.

13. The rethermalizing station of claim 10, the operations further comprising varying the power output of the induction coil by varying a current supplied to the induction coil.

14. The rethermalizing station of claim 13, further comprising:
  a body comprising a plurality of compartments configured to receive food pans;
  the induction coil, wherein the induction coil extends around the plurality of compartments; and
  a plurality of wheels coupled to the body such that the rethermalizing station is portable.

15. The rethermalizing station of claim 10, the operations further comprising turning off the induction coil when a resonant frequency of the induction coil is above a threshold value.

16. The rethermalizing station of claim 10, the operations further comprising selecting the selected temperature based on user input to the rethermalizing station.

17. The rethermalizing station of claim 10, further comprising a plurality of lift members configured to support the plurality of moveable bottom induction coils above a bottom of the well.

18. A method of operating a rethermalizing station comprising a well, a plurality of food pans configured to be positioned in the well, an induction coil extending around a perimeter of the well, and a plurality of moveable bottom induction coils configured to be repositioned in the well for alignment with the plurality of food pans, the method comprising controlling the induction coil without using an on/off duty cycle by:
  receiving a selected targeted temperature;
  defining an upper temperature limit as a function of the selected targeted temperature;
  automatically comparing a measured temperature of a food pan of the plurality of food pans to the upper temperature limit; and
  if the measured temperature of the food pan is greater than the upper temperature limit, controlling a power output of the induction coil to a non-zero value configured to allow the measured temperature to decrease toward the selected targeted temperature.

19. The method of claim 18, further comprising:
  comparing the measured temperature of the food pan to a lower temperature limit; and
  if the measured temperature of the food pan is less than the lower temperature limit, controlling the power output of the induction coil to a maximum power output.

* * * * *